(12) United States Patent
Takahashi et al.

(10) Patent No.: US 7,454,187 B2
(45) Date of Patent: Nov. 18, 2008

(54) HOME AGENT SYSTEM

(75) Inventors: Masahiro Takahashi, Kawasaki (JP);
Takeshi Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 588 days.

(21) Appl. No.: 10/951,750

(22) Filed: Sep. 28, 2004

(65) Prior Publication Data

US 2005/0265380 A1 Dec. 1, 2005

(30) Foreign Application Priority Data

Mar. 31, 2004 (JP) ............................. 2004-104619

(51) Int. Cl.
*H04Q 7/00* (2006.01)
(52) U.S. Cl. .................. 455/328; 370/464; 455/433; 455/435.1
(58) Field of Classification Search .............. 370/464, 370/328, 349, 336; 709/201, 202, 203, 328, 709/464; 455/3.06, 403, 406, 432.2, 433, 455/435.1
See application file for complete search history.

(56) References Cited

U.S. PATENT DOCUMENTS 6,952,582 B2 * 10/2005 Murai ........................ 455/433
6,970,902 B1 * 11/2005 Moon ......................... 709/201
7,136,365 B2 * 11/2006 Nakatsugawa et al. ...... 370/331

2004/0072569 A1 * 4/2004 Omae et al. ................. 455/445
2004/0242477 A1 * 12/2004 Smith et al. .................. 514/12
2005/0007995 A1 * 1/2005 Inoue et al. ................. 370/349
2005/0128975 A1 * 6/2005 Kobayashi et al. .......... 370/328

FOREIGN PATENT DOCUMENTS

JP 2004-096459 3/2004

OTHER PUBLICATIONS

James D. Solomon. Mobile Ip: The Internet Unplugged. Chapter 4 ISBN 4-89471-063-3, Jul. 27, 1998.

* cited by examiner

*Primary Examiner*—CongVan Tran
(74) *Attorney, Agent, or Firm*—Katten Muchin Rosenman LLP

(57) ABSTRACT

The home agent system of the present invention performs not only the process of managing the position information of a mobile node, but also the process of transferring a packet to the mobile node using the position information. The home agent system comprises one or more position processing devices processing the position information notification packet transmitted from the mobile node and acquiring the position information of the mobile node and a transfer processing device transferring the packet addressed to the mobile node, which is connected to one or more position processing devices. The transfer processing device has a position information management table which stores the position information acquired by the position processing device in association with the home address of the mobile node and a transfer unit transferring the packet addressed to the mobile node using the stored position information.

12 Claims, 30 Drawing Sheets

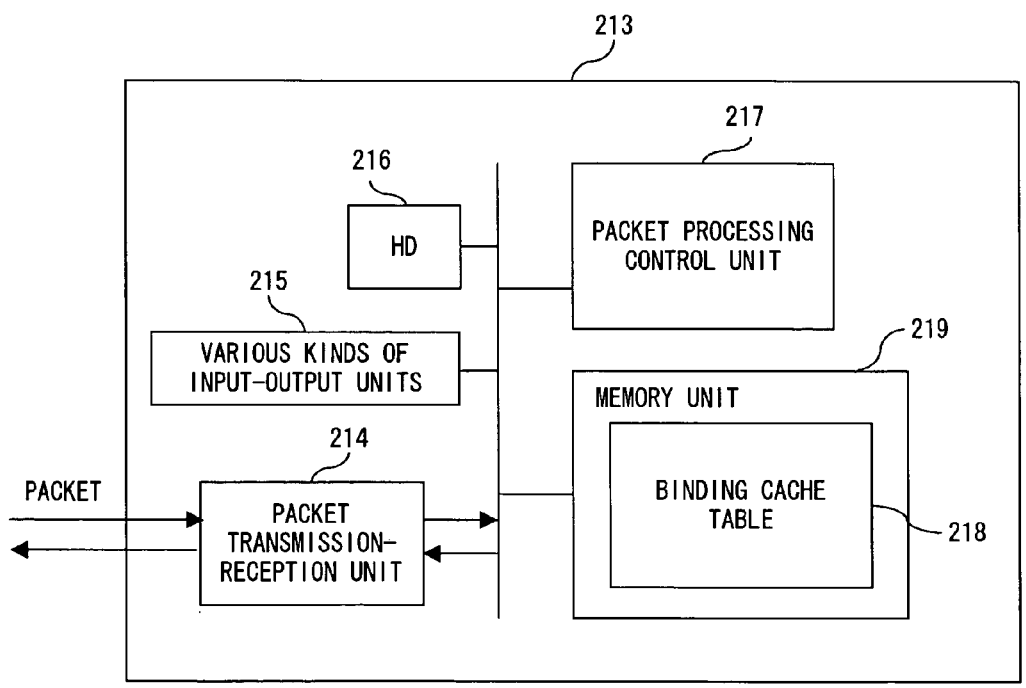
F I G. 1 B

CONFIGURATION OF BINDING CACHE TABLE WHICH TPHA OWNS

| HomeAddress#11 | Care-of Address#11 | Lifetime | OTHERS |
| --- | --- | --- | --- |
| : | : | | |
| HomeAddress#1K$_1$ | Care-of Address#1K$_1$ | Lifetime | OTHERS |
| HomeAddress#21 | Care-of Address#21 | Lifetime | OTHERS |
| : | : | | |
| HomeAddress#2K$_2$ | Care-of Address#2K$_2$ | Lifetime | OTHERS |
| HomeAddress#N1 | Care-of Address#N1 | Lifetime | OTHERS |
| : | : | | |
| HomeAddress#NK$_N$ | Care-of Address#NK$_N$ | Lifetime | OTHERS |

CONFIGURATION OF Binding Cache TABLE WHICH PPHA$_1$ OWNS

| HomeAddress#11 | Care-of Address#11 | Lifetime | OTHERS |
| --- | --- | --- | --- |
| HomeAddress#12 | Care-of Address#12 | Lifetime | OTHERS |
| | | | |
| . | . | . | . |
| . | . | . | . |
| . | . | . | . |
| HomeAddress#1K$_1$ | Care-of Address#1K$_1$ | Lifetime | |

CONFIGURATION OF Binding Cache TABLE WHICH PPHA$_2$ OWNS

| HomeAddress#21 | Care-of Address#21 | Lifetime | OTHERS |
| --- | --- | --- | --- |
| HomeAddress#22 | Care-of Address#22 | Lifetime | OTHERS |
| | | | |
| . | . | . | . |
| . | . | . | . |
| . | . | . | . |
| HomeAddress#2K$_2$ | Care-of Address#2K$_2$ | Lifetime | |

CONFIGURATION OF Binding Cache TABLE WHICH PPHA$_n$ OWNS

| HomeAddress#N1 | Care-of Address#N1 | Lifetime | OTHERS |
| --- | --- | --- | --- |
| HomeAddress#N2 | Care-of Address#N2 | Lifetime | OTHERS |
| | | | |
| . | . | . | . |
| . | . | . | . |
| . | . | . | . |
| HomeAddress#NK$_N$ | Care-of Address#NK$_N$ | Lifetime | |

F I G. 3

CONFIGURATION OF HEADER DATA FOR IPv4

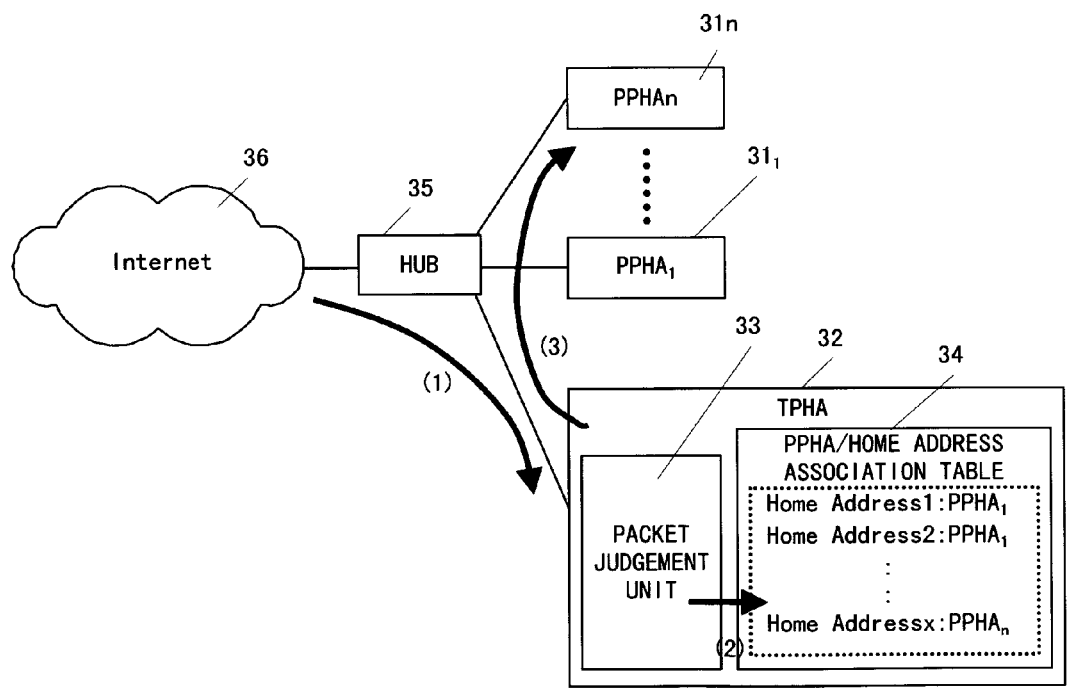
F I G. 5

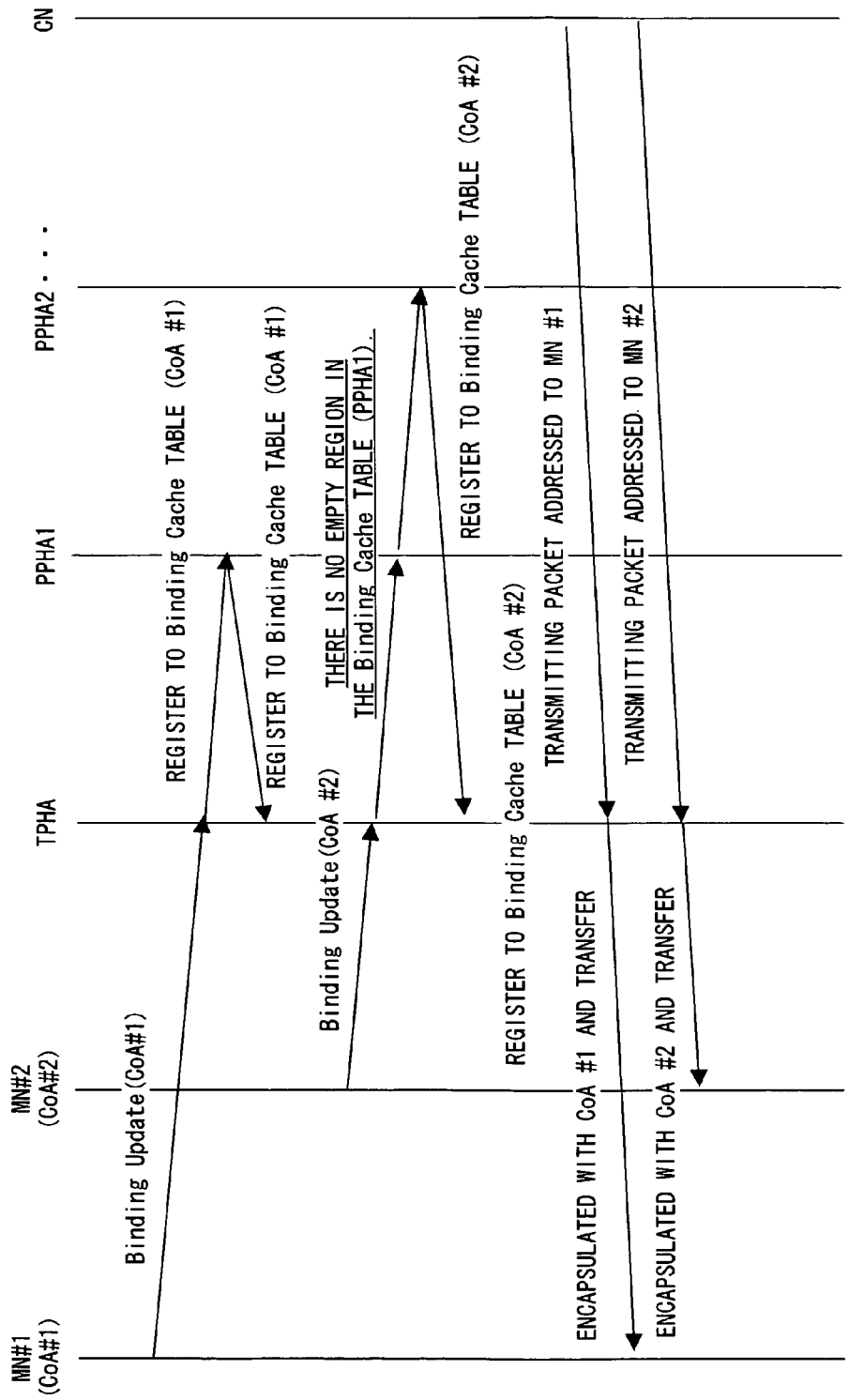
F I G. 17

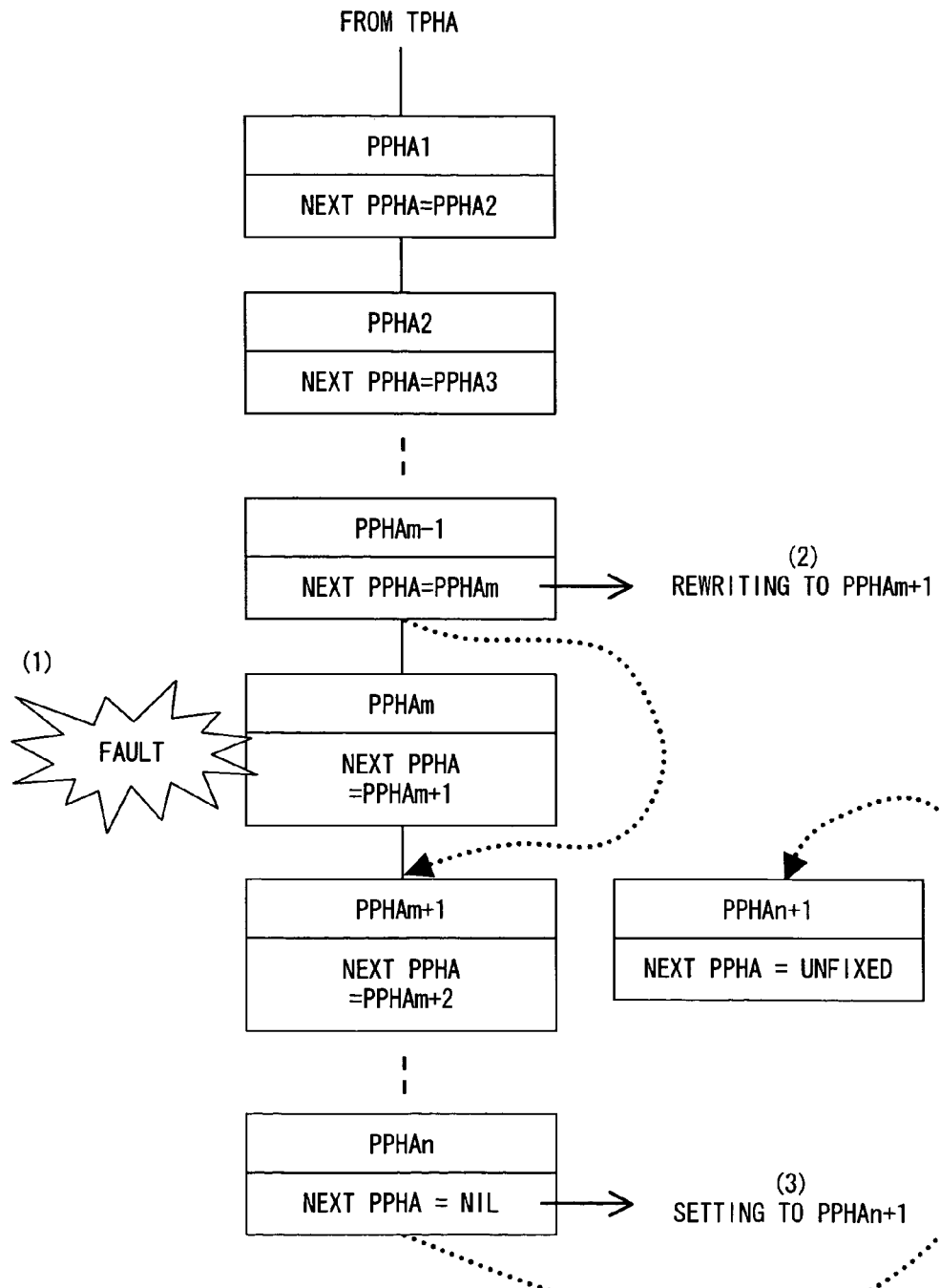
F I G. 2 0

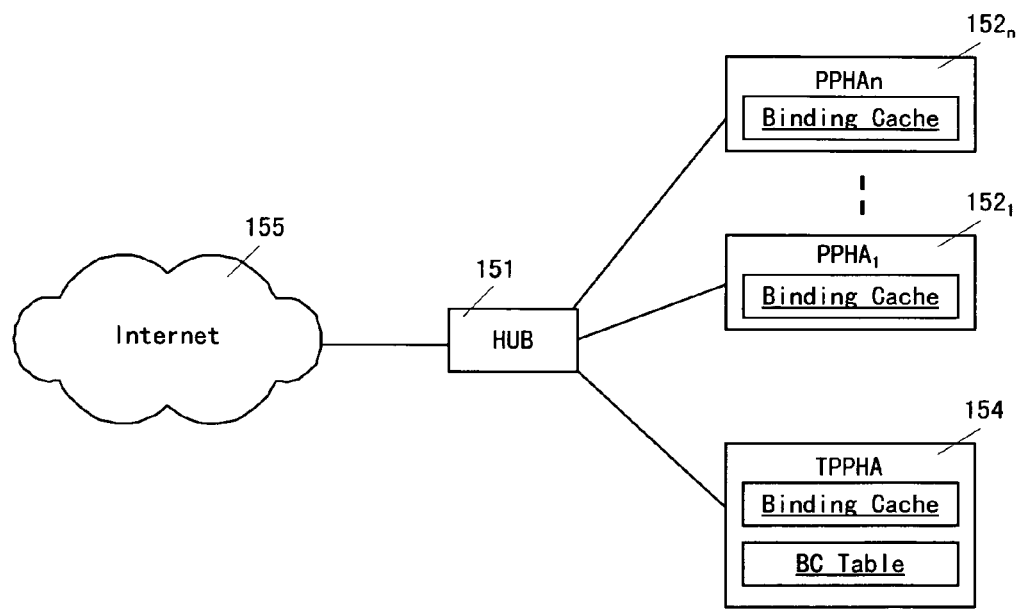
F I G. 2 3

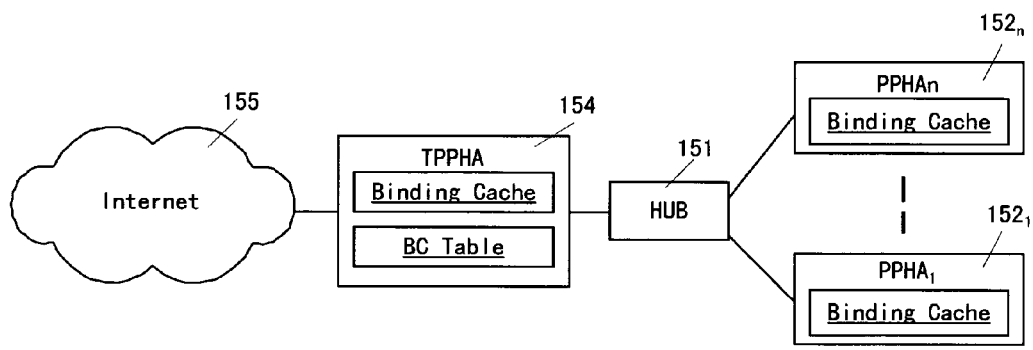
F I G. 2 4

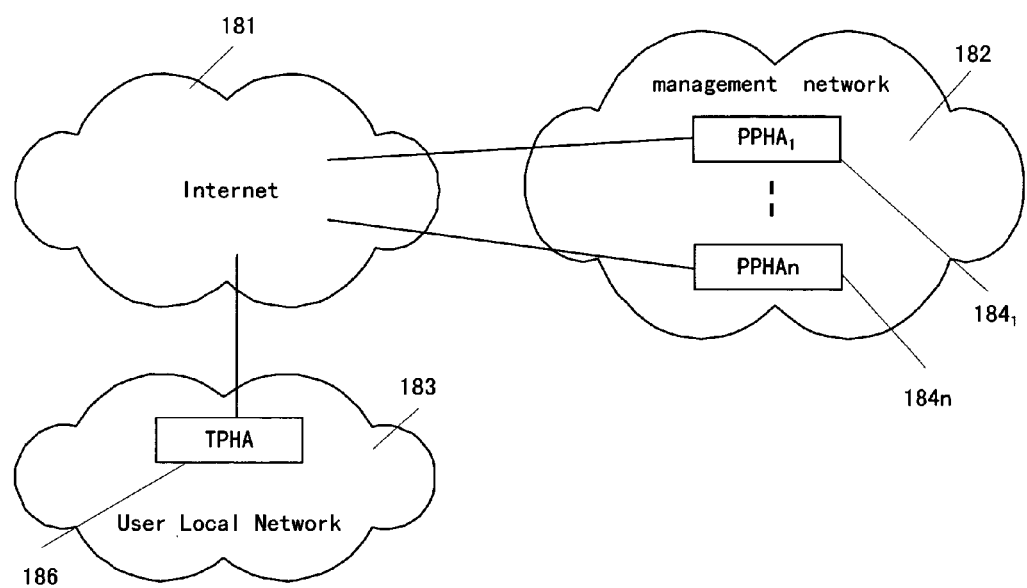
F I G. 2 6

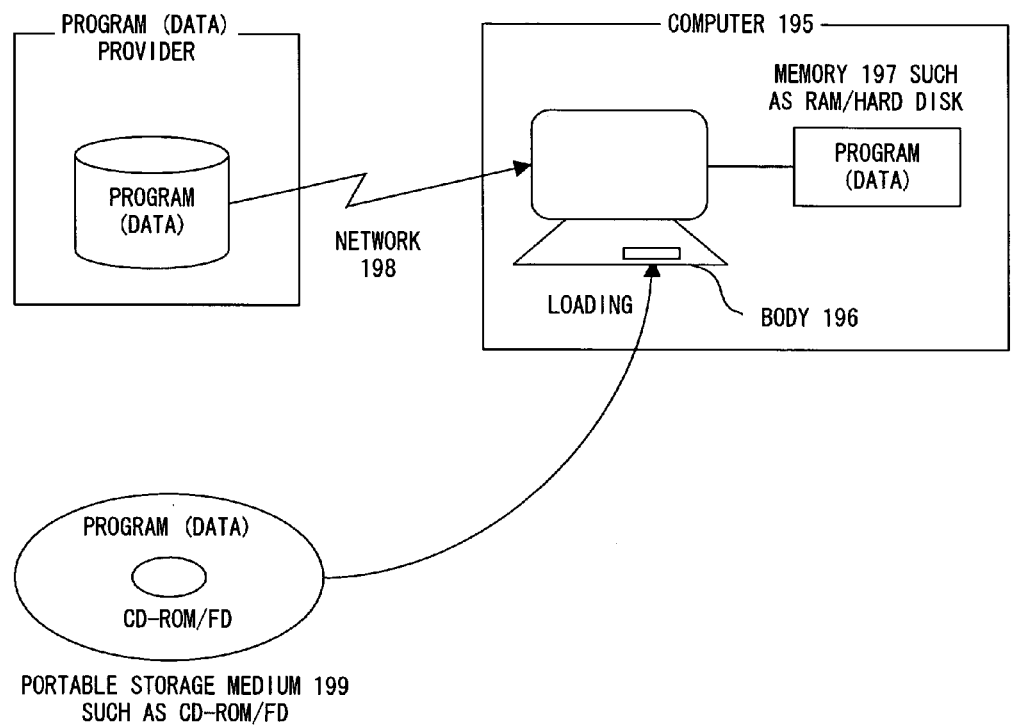
F I G. 27

HOME AGENT SYSTEM

BACKGROUND OF THE INVENTION

1. Field of the Invention

The present invention relates to a home agent of a mobile IP system.

2. Description of the Related Art

A home agent has a function for managing the care-of address (COA) indicating the present position of a mobile terminal (mobile node, MN), intercepting a packet transmitted from any other device to the mobile node, and transferring the packet to the care-of address of the mobile node. Therefore, the aforesaid other device can communicate with the mobile node merely by transmitting the packet to the home address indicating the initial registration address of the mobile node without recognizing the movement of the mobile node.

The care-of address in a home agent is managed by receiving and analyzing a position information notification packet (binding update packet) which is periodically transmitted from the mobile node. Naturally, this information differs for each mobile node, and not only the information is periodically transmitted, but also does it generate every time the mobile node moves, so the amount of information to be processed is enormous. Various kinds of terminals and a personal computer, for example, a PDA having a mobile function, a mobile IP telephone can be considered as the mobile node.

FIG. 1A shows the system configuration of a conventional home agent. A conventional home agent 213 is connected to an external network 211 via a HUB 212, as shown in FIG. 1A.

FIG. 1B is a block diagram showing the configuration of a conventional home agent. In FIG. 1B, the conventional home agent 213 comprises a packet transmission-receiving unit 214 transmitting and receiving a packet, various kinds of IO units 215, a HD 216 storing various kinds of programs for performing necessary processing, a packet processing control unit 217 in which packet processing is realized by loading and executing the stored programs, a memory unit 219 retaining a binding cache table 218.

The home agent shown in FIGS. 1A and 1B is built based on, for example, the contents described in non-patent document 1 shown below.

Non-patent document 1: "A Detailed Explanation of Internet Access from IP Mobile Nodes" Chapter 4, edited by James D. Solomon.

Home agents which generally exist today realize their function by having software such as KAME (http://www.kame.net) and USAGI (http://www.linux-ipv6.org/) installed onto a server device. Said software performs not only the process of managing the care-of address, but also the process of transferring a packet to the care-of address. When it is taken into consideration that the number of the registration addresses is tremendously enormous for one home agent, the amount of information to be processed is also enormous.

Most of the processing time is used for the position information processing for the position information notification packet transmitted from a mobile node. Particularly, when the process of transferring a packet to the care-of address is executed by the hardware which is inserted into an extended slot of a server system, not by the software, the processing amount of transfer to the care-of address which the hardware can process at a time is so huge that the ratio of the processing time used for the position information processing to the whole processing time is all the more high, thus causing the whole processing time to be further extended.

The fact that the home agent has a function for intercepting a packet to a mobile node and transferring the packet to a care-of address means that the home agent must be installed in the position where the packet is freely flowing so that the packet to the mobile node can be intercepted. However, in case the care-of address is altered by a malicious user, the packet to the mobile node is easily captured by him, so it is necessary to raise, particularly, the security level of the care-of address management function of the home agent. In other words, although a home agent must be installed in the place where general users can freely access it, its care-of address management function must be protected from malicious users.

As a recovery procedure to be used when a fault occurs to a home agent, the method of Dynamic Home Agent Address Discovery is stipulated in the IETF-Draft. In this method, when a mobile node detects a fault of the home agent, another home agent is retrieved; a position information notification packet is transmitted to the retrieved alternative home agent; the alternative home page analyzes and sets the position information notification packet; after then, the packet is transferred to a care-of address.

However, there is a problem in that as is apparent from the fact that the detection of a fault of the home agent by the mobile node works as a trigger, this recovery procedure is not carried out without interruption, and there is a problem that a lot of time is taken for the recovery. Moreover, since switching processing is executed via the mobile node, namely under the initiative of a user, it is a prerequisite that the mobile node which the user has must have a fault detection function. Therefore, the home agent itself cannot be said to have a recovery function.

SUMMARY OF THE INVENTION

A first purpose of the present invention is to provide a home agent system which can improve the processing ability of the care-of address management function.

A second purpose of the present invention is to provide a home agent system which can improve the security level of the care-of address management function.

A third purpose of the present invention is to provide a home agent system which can continue the processing without interruption when a fault occurs to the home agent system.

The home agent system of the present invention performs not only the process of managing the position information of a mobile node, but also the process of transferring a packet to the mobile node using the position information. The home agent system comprises one or more position processing devices processing the position information notification packet transmitted from a mobile node and acquiring the position information of the mobile node and a transfer processing device transferring the packet to the mobile node, which is connected to said one or more position processing devices. The transfer processing device comprises a position information management table which stores the position information acquired by the position processing device in association with the home address of the mobile node and a transfer unit transferring the packet addressed to the mobile node using the stored position information.

BRIEF DESCRIPTION OF THE DRAWINGS

FIG. 1B is a block diagram showing the configuration of a conventional mobile agent.

FIG. 3 shows an example of the position information management table provided on the side of a transfer processing home agent (TPHA) and on the side of a position processing home agent (PPHA).

FIG. 5 is a schematic diagram of the home agent system in a first embodiment of the present invention.

FIG. 17 shows the transmission sequence of the binding update packet for binding update processing and the packet addressed to a user in a second embodiment.

FIG. 20 shows the process of changing the transmission order between PPHAs in the first method of the second embodiment.

FIG. 23 is a block diagram showing a variation of each embodiment.

FIG. 24 is a variation in which the disposition of components shown in FIG. 23 is changed.

FIG. 26 shows an example of the configuration which makes the reduction of a processing load possible when the home agent system is constituted by a rough coupling type.

FIG. 27 shows the loading of a program.

DESCRIPTION OF THE PREFERRED EMBODIMENTS

Described below are the preferred embodiments for carrying out the present invention with reference to the accompanying drawings.

Figure 1A:
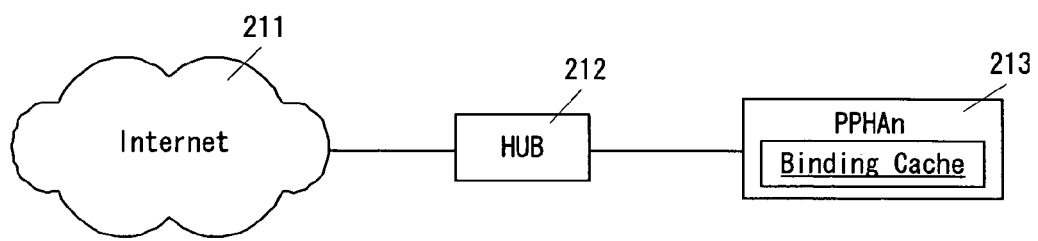
FIG. 1A is a diagram showing the configuration of a system including a conventional mobile agent.
Figure 2A:
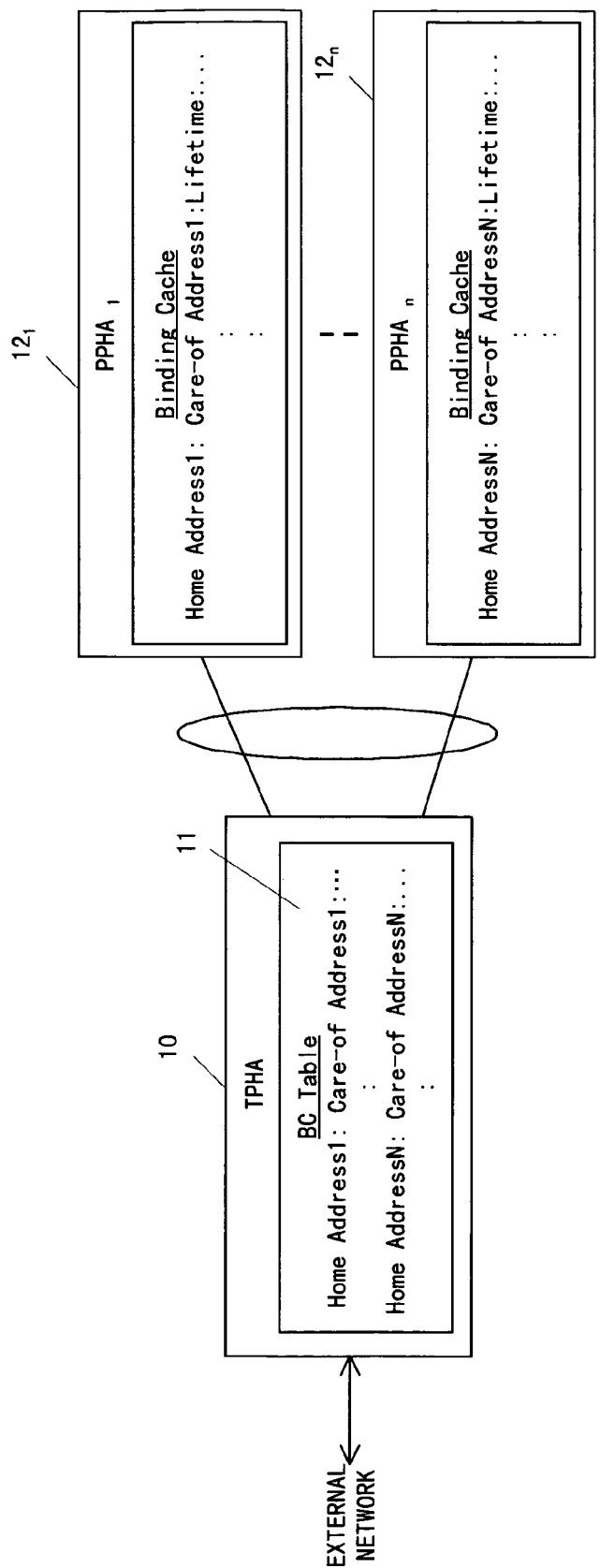
FIG. 2A is a block diagram showing the configuration of the home agent system of the present invention.

The first home agent system of the present invention comprises one or more position processing devices $12_1, \ldots, 12_n$ processing a position information notification packet transmitted from a mobile node and acquiring the position information of the mobile node and a transfer processing device 10 transferring the packet addressed to the mobile node, which is connected to said one or more position processing devices, in the home agent system which manages the position information of a mobile node and transfers the packet addressed to the mobile node using the position information, as shown in FIG. 2A, and the transfer processing device 10 has a position information management table 11 which stores the position information acquired by the position processing device in association with the home address of the mobile node and a transfer unit transferring the packet addressed to the mobile node using the stored position information.

The processing ability of the care-of address management function can be improved by providing one or more position processing devices performing the position information processing of the mobile node separated from the transfer processing device. Particularly, when a plurality of position processing devices are provided, position information is processed in parallel in the position processing devices, so the processing ability can be further improved. A plurality of position processing devices are shown in FIG. 2A, but a number of position processing devices can also be changed to one.

The second home agent system of the present invention is the one in which the transfer processing device is installed in a network having a first security level, and one or more position processing devices are installed in a network having a higher security level than the first security level, in the first home agent system.

Since the transfer processing device transferring a packet and one or more position processing devices are installed separately from each other, it is possible to set a security level according to the processing contents of each device. For example, when one or more position processing devices are installed in a network having a high security level, it is possible to improve the security level of the care-of address management function which one or more position processing devices operate.

The third home agent system of the present invention is the one in which the transfer unit intercepts the position information notification packet and transfers it to any of the position processing devices, and the position information management table stores the position information acquired by the position processing device to which the position information notification packet is transferred, in the first home agent system.

The fourth home agent system of the present invention is the one in which the transfer processing device comprises a position processing device—home address association table which stores the position processing device in charge of processing in association with the managed home address of each mobile node and a transmission-destination device determination unit determining the position processing device of a transmission destination of a position information notification packet based on the position processing device—home address association table, and the transfer unit transmits the position information notification packet to the determined transmission destination, in the third home agent system.

The fifth home agent system of the present invention is the one in which the position processing device comprises a receiving unit receiving the position information notification packet of the mobile node; a position processing execution possibility determination unit determining whether the received position information notification packet should be processed by the position processing device; a position information management table which stores the position information obtained by processing the position information notification packet when the position information notification packet is determined to be processed by the position processing device; a transfer destination setting unit setting the position processing device to which the position information notification packet is transferred next as a transfer destination for the position information notification packet when the position information notification packet is determined not to be processed by the position processing device; and a transmission unit transmitting the position information notification packet in which the transfer destination is set, in the third home agent system.

The sixth home agent system of the present invention is the one which further comprises an operation management unit which instructs, when a fault occurred to any of the position processing devices, the transfer processing device to separate the part in which the fault has occurred and a spare position processing device to be used when the fault occurs to a position processing device, in the fourth home agent system, and the operation management unit re-sets the home address of each mobile node associated with the position processing device in which the fault has occurred so that said home address is associated with the spare position processing device.

A fault occurring to any of the position processing devices is detected by the operation management unit, and the home address of each mobile node associated with the position processing device in which the fault has occurred is re-set so that said home address is associated with the spare position processing device, so the defective position processing device can be restored to normal order without interruption and without waiting for the detection of the fault by the mobile node.

The seventh home agent system of the present invention is the one which further comprises an operation management unit which instructs, when a fault has occurred to any of the position processing devices, the position processing device related to the defective position processing device to separate the part in which the fault has occurred, in the fifth home agent system, and the operation management unit instructs the related position processing device to set the position processing device of the transmission destination so as to avoid the part in which the fault has occurred when the fault has occurred.

A fault occurring to any of the position processing devices is detected by the operation management unit, and the related position processing device is instructed to separate the part in which the fault has occurred, so the defective position processing device can be restored to normal order without interruption and without waiting for the detection of the fault by the mobile node.

According to the present invention, since one or more position processing devices performing the position information processing of a mobile node are installed separately from the transfer processing device, the processing ability of the care-of address management function can be improved. Particularly, when a plurality of position processing devices are installed, position information can be processed in parallel by the position processing devices, so the processing ability can be further improved.

Also, according to the present invention, since the transfer processing device transferring a packet and one or more position processing devices are installed separately from each other, it is possible to set a security level according to the processing contents of each device. For example, when one or more position processing devices are installed in a network having a high security level, it is possible to improve the security level of the care-of address management function which one or more position processing devices operate.

Also, according to the present invention, a fault occurring to any of the position processing devices is detected by the operation management unit, and the home address of each mobile node associated with the position processing device in which the fault has occurred is re-set so that said home address is associated with the spare position processing device, so the defective position processing device can be restored to normal order without interruption and without waiting for the detection of the fault by the mobile node.

Also, according to the present invention, a fault occurring to any of the position processing devices is detected by the operation management unit, and the position processing device related to the defective position processing device is instructed to separate the part in which the fault has occurred, so the defective position processing device can be restored to normal order without interruption and without waiting for the detection of the fault by the mobile node.

Figure 2B:
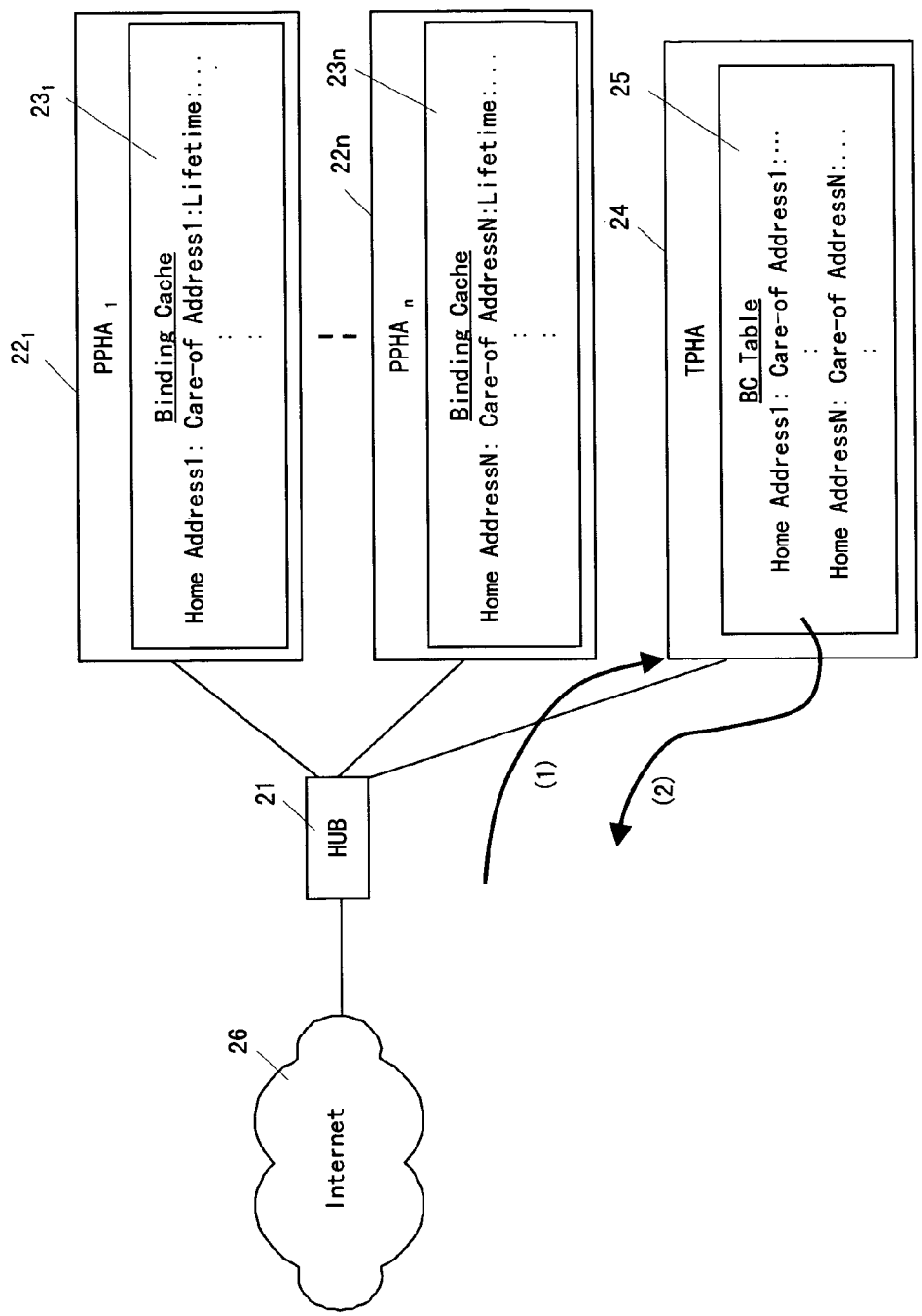
FIG. 2B is a block diagram showing the configuration of the home agent system common to the first and second embodiments of the present invention.

FIG. 2B is a block diagram showing the configuration of the home agent system common to the first and second embodiments of the present invention.

In FIG. 2B, the home agent system is comprised by connecting one or more position processing home agents (PPHA) $22_1 \ldots 22_n$ and a transfer processing home agent (TPHA) 24 by a HUB 21 to form an internal network. One side of the HUB 21 is connected to an external network 26, and packets are transmitted to and received from outside via the external network 26. The PPHA $22_1 \ldots 22_n$ and the TPHA 24 have a position information management table (binding cache table) $22_1 \ldots 22_n$ 25 for managing the position information of the present position of a mobile node.

Home addresses and care-of addresses (present position information) are associated and stored in these position information management tables. The position information management table of the TPHA 24 is obtained by collecting the information of the position information management tables $22_1 \ldots 22_n$ of each PPHA.

This home agent system manages the position information of a mobile node which has been registered to said system, and performs the process of transferring the communication data transmitted from a corresponding node to the managing target mobile node.

In managing position information, the TPHA 24 periodically receives a position information notification packet (binding update packet, BU packet) from the mobile node, and returns the binding acknowledgement packet (BAck packet) to the mobile node as a response to the position information notification packet. In PPHA $22_1 \ldots 22_n$, a position information processing is performed, for example, if the current position of the transmitting source mobile node of the received packet is under TPHA 24, information about the transmitting source mobile node is removed from the entry of the position information management table.

When data from a corresponding node is transferred to the mobile node, the care-of address associated with the home address of the mobile node which is obtained with reference to the position information management table is used as the transfer destination.

FIG. 3 shows an example of the position information management table provided on the side of a transfer processing home agent (TPHA) and on the side of a position processing home agent (PPHA).

In FIG. 3, the position information management table provided on the side of the TPHA is shown in the first table. In and after the second table, the position information management table provided on the side of the PPHA is shown.

In the first table shown in FIG. 3, it is indicated that the number of $K_1+K_2+\ldots K_n$ home addresses from "Home Address #11" to "Home Address #$1K_1$", "Home Address #21" to "Home Address #$2K_2$" ... "Home Address #N1" to "Home Address #$NK_N$" are managed by the TPHA.

In the second table shown in FIG. 3, it is indicated that the number of $K_1$ home addresses from "Home Address #11" to "Home Address #$1K_1$" are managed by the $PPHA_1$.

In the third table shown in FIG. 3, it is indicated that the number of $K_2$ home addresses from "Home Address #21" to "Home Address #$2K_2$" are managed by the $PPHA_2$.

In the last table shown in FIG. 3, it is indicated that the number of $K_N$ home addresses from "Home Address #N1" to "Home Address #$NK_N$" are managed by the $PPHA_N$.

In FIG. 3, in each position information management table, home address and care-of address are stored in association. Lifetime is an item which is provided in the position information management table on the side of either the TPHA or the PPHA or is provided in the position information management table on the side of both the TPHA and the PPHA. Lifetime is set to a predetermined value when the BU packet is received, and its counting-down is started at that time. When the value becomes 0 (zero) before the time when the next BU packet is received, the corresponding data item is deleted from the position information management table.

In this process of deleting the data, when the data whose lifetime has expired is deleted from the position information management table provided on the side of either the TPHA or the PPHA, this fact is notified to the other position information management table of the TPHA or the PPHA as a deleted information packet. Then, the corresponding data is also deleted from the other position information management table according to the contents of the notification.

Figure 4A:
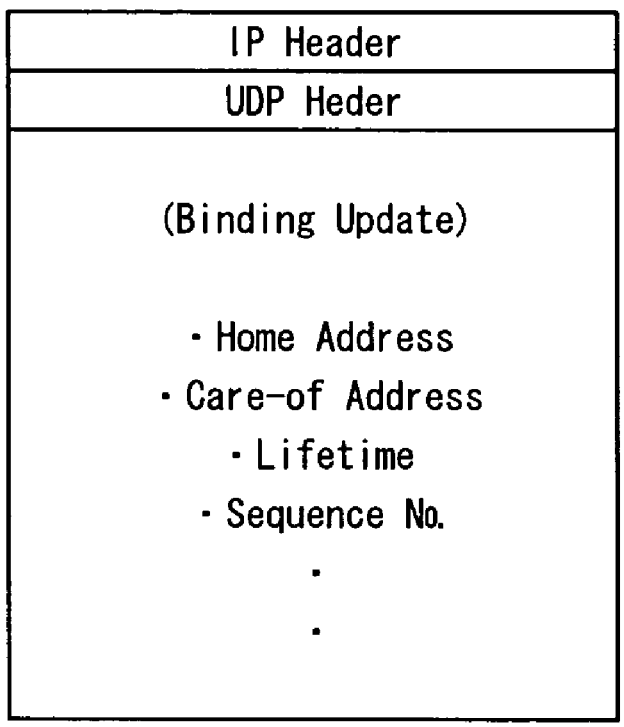
FIG. 4A shows the data configuration of a BU packet for IPv4.
Figure 4B:
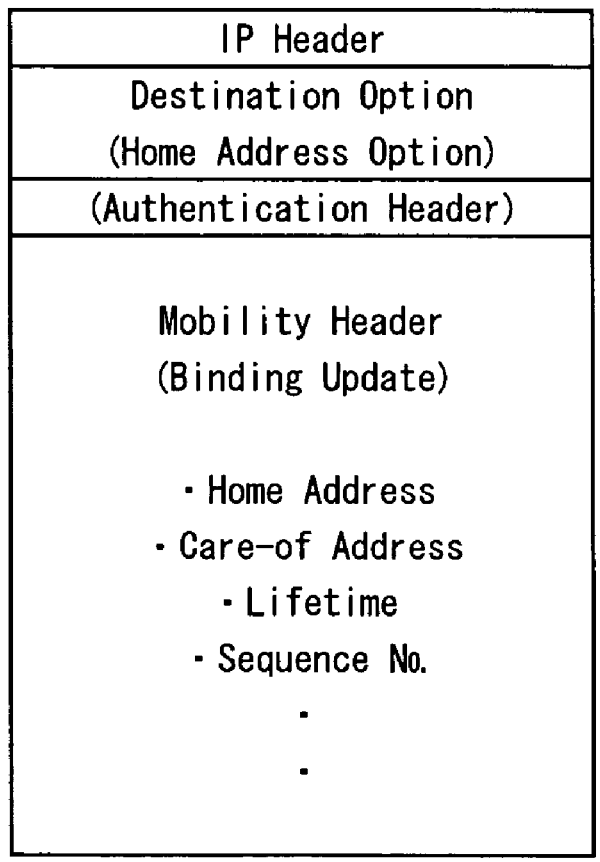
FIG. 4B shows the data configuration of a BU packet for IPv6.

FIG. 4A shows the data configuration of a BU packet for IPv4, and FIG. 4B shows the data configuration of a BU packet for IPv6. The home address of the mobile node corresponding to the BU packet is acquired by referring to the source address included in the IP header, for the BU packet of both Ipv4 and Ipv6, as shown in FIG. 4A and FIG. 4B.

In FIG. 4A and FIG. 4B, "sequence No." is the data used to guarantee the reliability of the packet when the packet is transmitted and received between the mobile node and the home agent system, and its value is changed according to the rule, such as, counting up the packet every time the packet is transmitted etc. For example, the sequence No. which is set to "1" in the BU packet transmitted from the mobile node is received by the TPHA, and when the corresponding BAck packet is transmitted, the sequence No. is counted up from "1" to "2", and the transmission and receiving of the packet is continued.

FIG. 5 is a schematic diagram of the home agent system in a first embodiment of the present invention.

In the first embodiment, TPHA 32 receives the BU packet of the mobile node from a network 36 via a HUB 35, as shown in FIG. 5. The TPHA 32 which receives the BU packet determines the PPHA of the transmission destination of the BU packet in a packet judgement unit 33 based on a PPHA—home address association table 34 which indicates a list of PPHAs ($31_1 \ldots 31_n$) as a transmission destinations of the BU packet from the TPHA 32 and the home address each PPHA manages.

Figure 6:
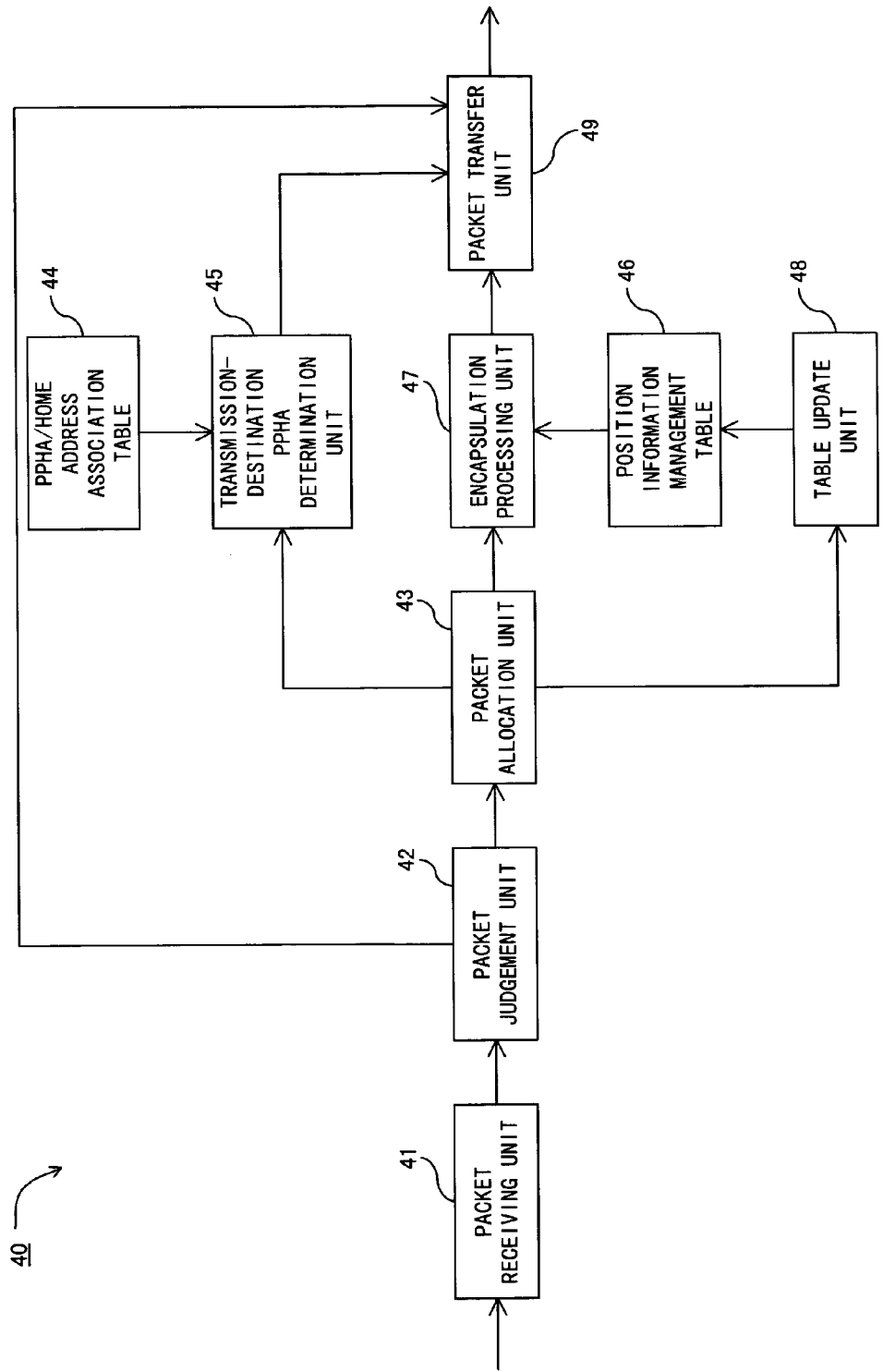
FIG. 6 is a block diagram showing the configuration of the transfer processing home agent (TPHA) in a first embodiment.

FIG. 6 is a block diagram showing the configuration of the transfer processing home agent (TPHA) in the first embodiment.

In FIG. 6, TPHA 40 comprises a packet receiving unit 41 receiving a packet from outside, a packet judgement unit 42 judging whether the received packet should be processed by the TPHA 40, a packet allocation unit 43 allocating the packet processing based on the kind of the packet which is judged by the packet judgement unit 42 to be processed by the TPHA 40, a transmission-destination PPHA determination unit 45 determining the PPHA of the transmission destination with reference to the PPHA-home address association table 44, an encapsulation processing unit 47 encapsulating an original packet by the packet which sets the care-of address corresponding to the home address as the transmission destination for the packet to the home address of the mobile node which is transmitted from the corresponding node (CN) with reference to the position information management table 46, a table update unit 48 updating the position information management table 46 by reflecting the contents included in the processing result packet of the position information processing of the PPHA, and a packet transmission unit 49 transmitting the packet to a set transmission destination.

When the packet is the one which the TPHA 40 intercepts and the home address included in the packet is out of the management of the TPHA 40, when the BAck packet produced by one of the PPHAs connected to the THPA 40 is transmitted to the corresponding mobile node via the TPHA 40, etc., the packet is judged to be a packet which does not require any particular processing, and is transmitted to the packet transmission unit 49, and then is transmitted therefrom to outside.

Figure 7:
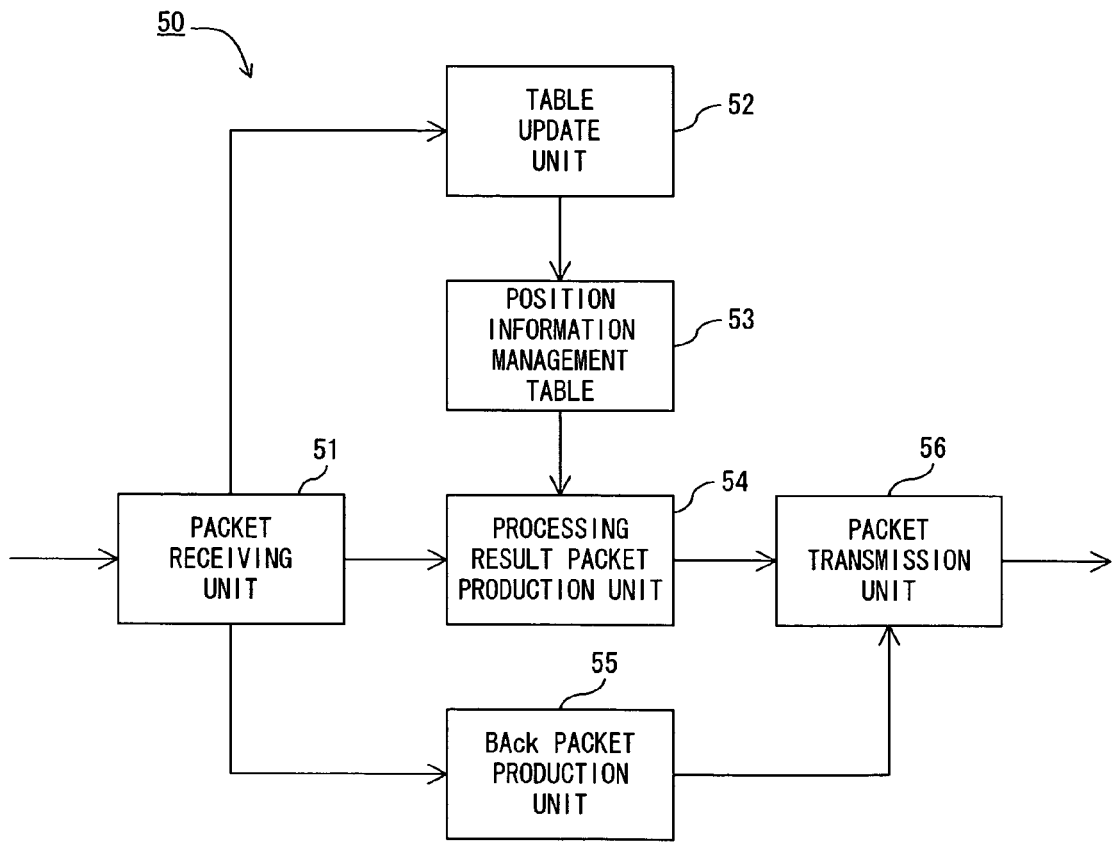
FIG. 7 is a block diagram showing the configuration of the position processing home agent (PPHA) in a first embodiment.

FIG. 7 is a block diagram showing the configuration of the position processing home agent (PPHA) in the first embodiment.

In FIG. 7, the PPHA 50 mainly executes the processing of the position information notification packet from a user on the platform of a server device, etc., namely a binding update processing. The PPHA 50 comprises a packet receiving unit 51 receiving a BU packet, a table update unit updating the position information management table 53 based on the received BU packet, a processing result packet production unit 54 producing a processing result notification packet used to notify the contents of the table as a result of update processing to the TPHA 40, a BAck packet production unit 55 producing a response packet (BAck packet) to the user (mobile node) in correspondence with the receiving of the BU packet, and a packet transmission unit 56 transmitting the packet to the transmission destination which has been set.

Figure 8:
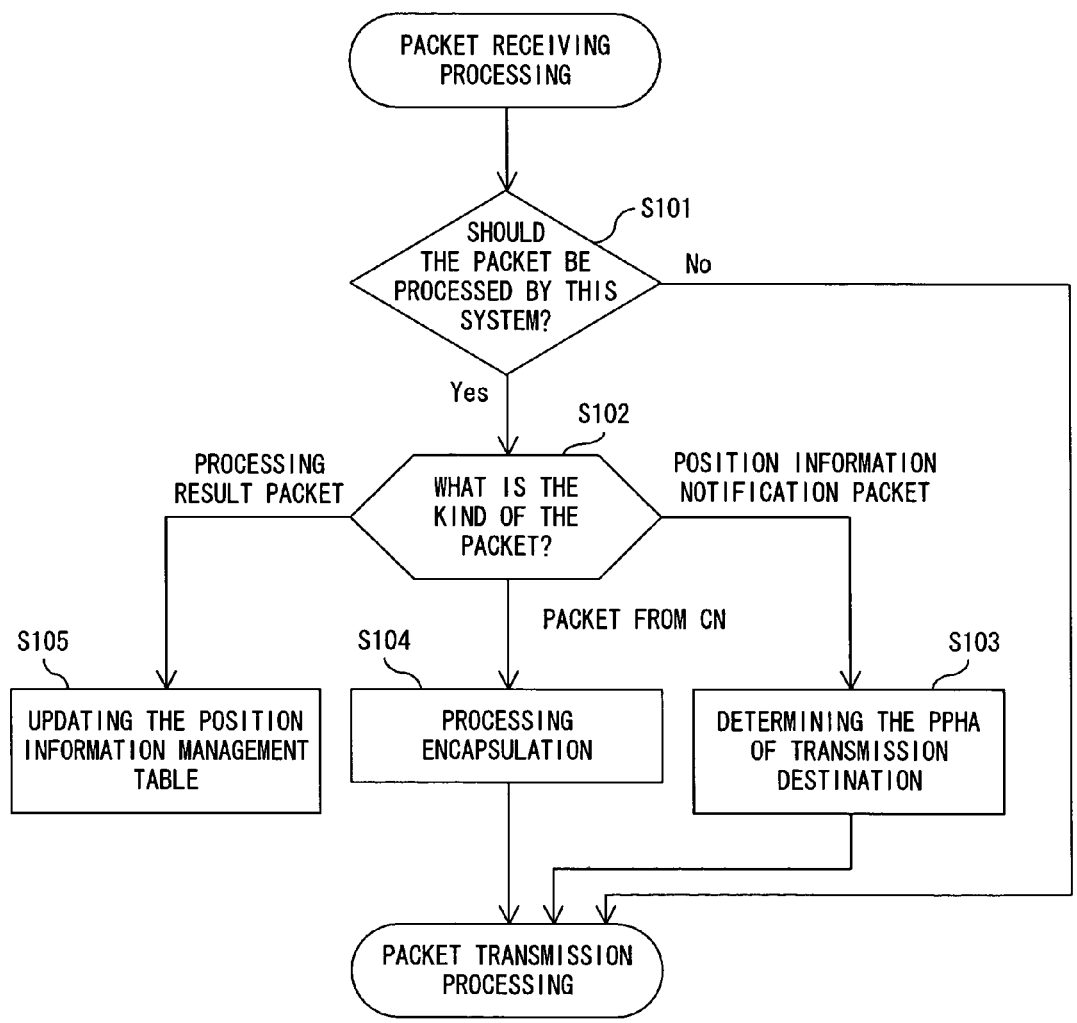
FIG. 8 is a flowchart showing the processing performed by the TPHA in a first embodiment.

FIG. 8 is a flowchart showing the processing performed by the TPHA in the first embodiment.

In FIG. 8, when a packet is received by the packet receiving unit in the TPHA, a series of processing is started.

First, in Step S101, the judgement unit 42 shown in FIG. 6 judges whether the received packet should be processed by this home agent system (TPHA, PPHA).

In this judgement processing, the home address of the mobile node corresponding to the BU packet is acquired from, for example, the source address included in the IP header of the BU packet shown in FIG. 4. The acquired address is compared with the home address in the home address list table (not shown in the accompanying drawings) (which is retained by the TPHA) indicating a list of home addresses registered in this home agent system. When the home address of the received packet conforms to any of the home addresses in the home address list table, the packet is judged to be processed by this home agent system.

When the packet is judged to be processed by this home agent system in Step S101, the packet allocation unit 43 judges the kind of the packet and allocates the subsequent processing according to the judged kind of the packet in Step S102.

When the packet is judged to be a BU packet in Step S102, the transmission-destination PPHA determination unit 45 determines the PPHA which is in charge of the received BU packet as the PPHA of the transmission destination by referring to the PPHA—home address association table 44 in Step S103. Then, the packet transmission unit 49 performs the process of transmitting the packet to the designated transmission destination.

When the packet is judged to be the packet transmitted from the corresponding node to the home address of the mobile node in Step S102, then in Step S104, the home address in the position information management table 46 of the TPHA is referred to and the care-of address of the home address which conforms to the home address of the packet is acquired. And, the encapsulation processing unit 47 encapsulates an original packet by the packet which sets the care-of address as the transmission destination. The encapsulated packet is transmitted to an external network via the packet transmission unit 49.

When the packet is judged to be the processing result packet from any of the PPHAs connected to the TPHA via a network in Step S102, then, in Step S105, the position information management table 46 of the TPHA is updated by the table update unit 48 based on the contents included in the processing result packet.

When the packet is judged to be the packet which should not be processed by this home agent system in Step S101, for example, if the home address included in the packet which the TPHA intercepts is out of the management of the TPHA, the packet is transmitted from the packet judgement unit 42 to the packet transmission unit 49 and is transmitted to a designated address.

Figure 9:
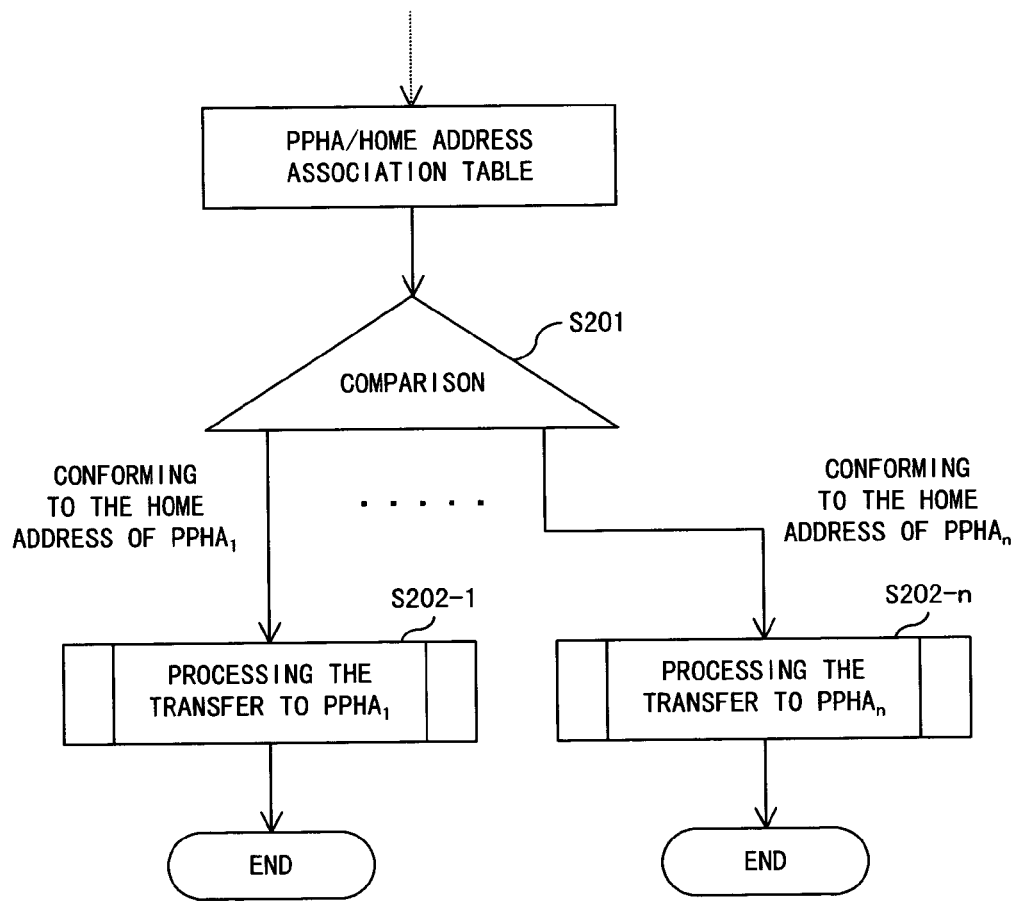
FIG. 9 is a flowchart showing the process of determining the PPHA in charge of processing.

FIG. 9 is a flowchart showing the process of determining the PPHA in charge of processing. This process corresponds to the combination of Step S103 and the packet transmission processing shown in FIG. 8.

In FIG. 9, the home address included in the BU packet is compared with the home address stored in the field for the home address in the PPHA-home address association table in Step S201. Then, the PPHA in charge of the processing is determined based on the comparison result. For example, if $PPHA_1$ is set as the PPHA in charge of processing for the home address included in the BU packet in the PPHA—home address association table, the BU packet is transmitted to $PPHA_1$ as shown in Step S202-1. Also, for example, when $PPHA_n$ is set as the PPHA in charge of processing for the home address included in the BU packet in the PPHA—home address association table, the BU packet is transmitted to the $PPHA_n$ as shown in Step S202-n.

Figure 10:
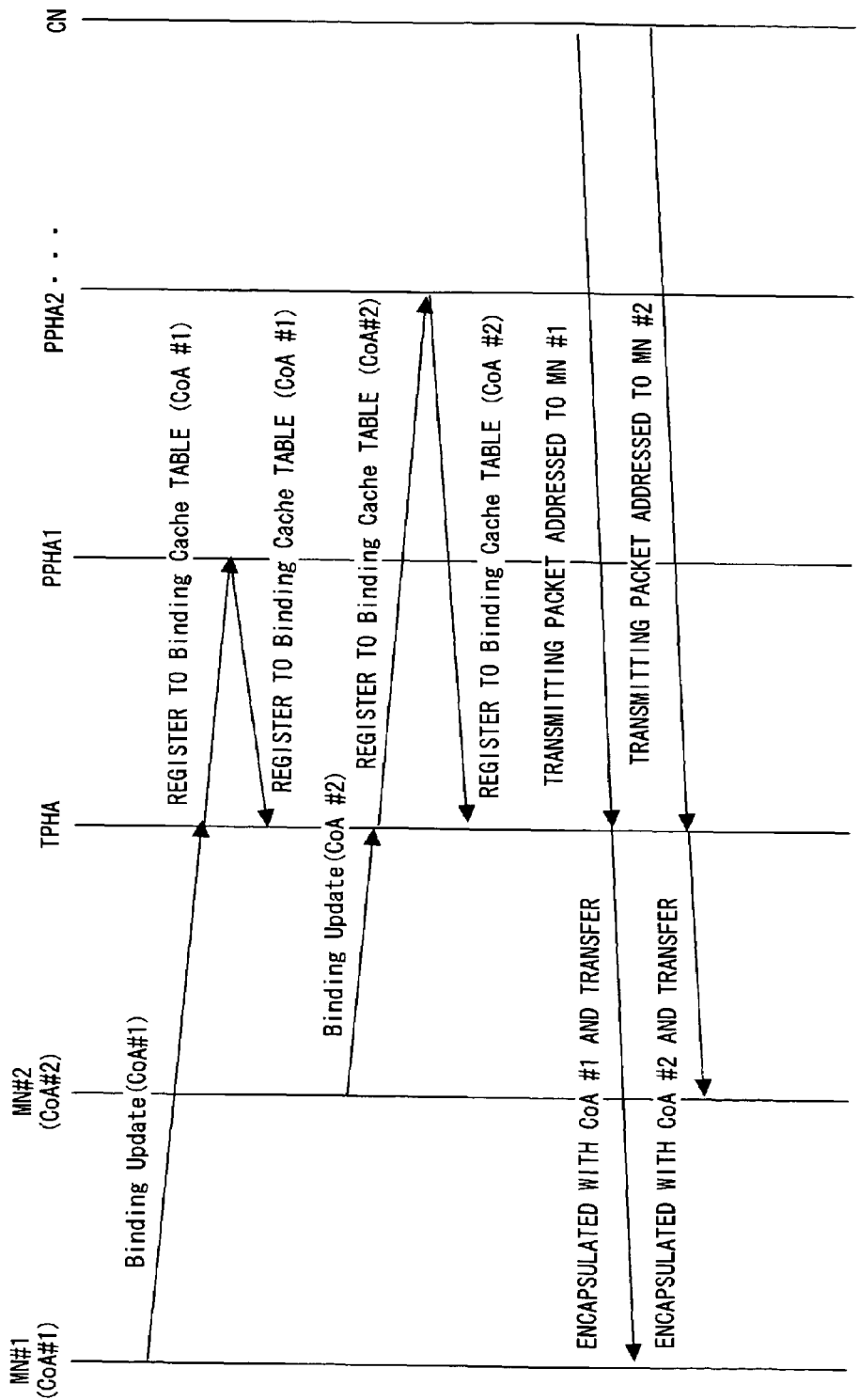
FIG. 10 shows the transmission sequence of the binding update packet for binding update processing and the packet addressed to a user in a first embodiment.

FIG. 10 shows the transmission sequence of the binding update packet for binding update processing and the packet addressed to a user in the first embodiment.

In FIG. 10, mobile node MN #1 transmits the BU packet to the TPHA from the movement destination having care-of address CoA #1. Mobile node MN #2 transmits the BU packet to the TPHA from the movement destination having care-of address CoA #2.

The TPHA shown in FIG. 10 is the home agent which manages the home addresses of mobile nodes MN #1 and MN #2. Therefore, when the TPHA receives the BU packet from mobile nodes MN #1 and MN #2, the BU packet is judged to be the packet which should be process by the TPHA, and the position information management table of TPHA and corresponding PPHAs are updated based on the information included in the BU packet.

For example, in FIG. 10, information indicating that mobile node MN #1 is allocated to PPHA #1 and mobile node #2 is allocated to PPHA #2 is stored in the PPHA—home address association table of the TPHA. The BU packets from mobile nodes MN #1 and MN #2 are allocated to PPHA #1 and PPHA #2 respectively based on this information. The PPHA #1 and PPHA #2 make a position information management table from the information included in the packet (update the related part in the table), and notify the update of the related part to the TPHA which transfers a user packet.

The TPHA develops its own position information management table based on the update contents notified by the PPHAs #1 and #2.

In the drawing of the sequence shown in FIG. 10, packets are transmitted to mobile nodes MN #1 and MN #2 from the corresponding node (CN) after then. These packets are transmitted to the TPHA which manages the home address of mobile nodes MN #1 and MN #2, the TPHA performs the process of encapsulating CoA #1 and CoA #2 which are the present movement destinations to the transmitted packet with reference to the position information management table, and transfers the packet to care-of addresses CoA #1 and CoA #2.

Figure 11:
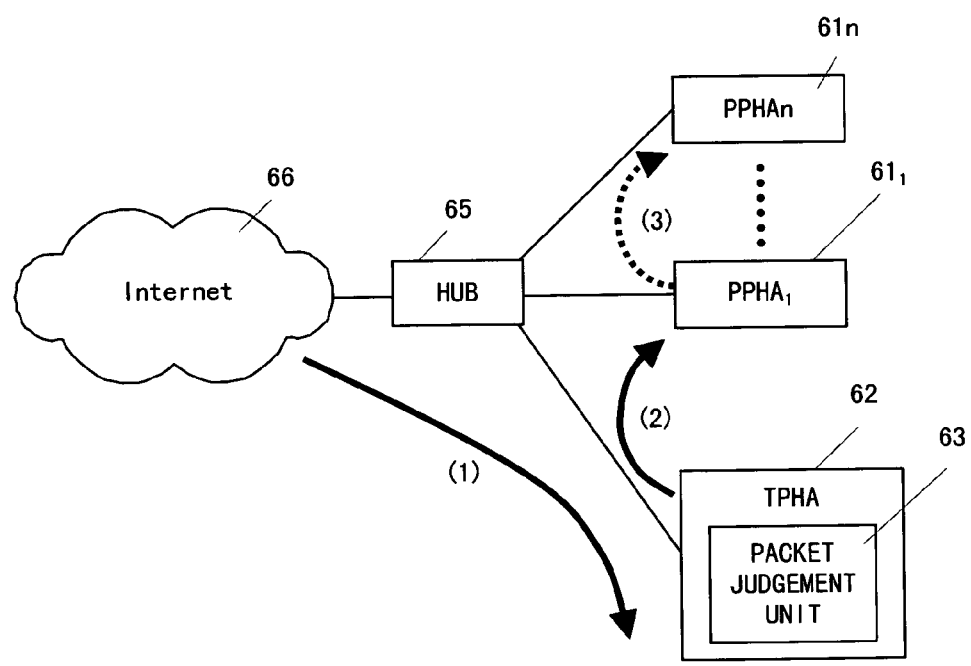
FIG. 11 is a schematic diagram of the home agent system in a second embodiment of the present invention.

FIG. 11 is a schematic diagram of the home agent system in the second embodiment of the present invention. In a second embodiment, explanations of the same parts as in the first embodiment are omitted in principle.

The difference between the first embodiment and the second embodiment is the transfer process of a BU packet. In short, the order of the transfer of a BU packet is set in advance in the second embodiment. For example, in FIG. 11, the transfer order is set in advance so that a packet is transferred in the order of $TPHA \rightarrow PPHA_1 \rightarrow PPHA_2 \rightarrow \ldots PPHA_n$. The transfer order can be set by designating a "next PPHA" which is the next PPHA to which the BU packet is transferred in each device. In other words, the TPHA 62 or each PPHA $61_1 \ldots 61_n$ transfers the BU packet to the "next PPHA" designated by the transmission-destination PPHA setting unit. Any transfer destination which satisfies a given condition (the same BU packet has already existed or if not, there is an enough open region, and so forth) executes any necessary processing for the BU packet. In other words, each PPHA which receives the BU packet performs the process of determining whether position information processing should be executed.

In FIG. 11, the TPHA 62 receives the BU packet transmitted from a mobile node under management from the network 66 via the HUB 65. In the TPHA 62 which receive this BU packet, for example, whether this Bu packet is transmitted from a mobile node under management, and so whether this BU packet should be processed by the TPHA 62 is judged by the packet judgment unit 63. As a result of this judgment, when the BU packet is judged to be the packet which should be processed by the TPHA 62, the BU packet is transferred from the TPHA 62 to the PPHA 61, according to the above transfer order.

Figure 12:
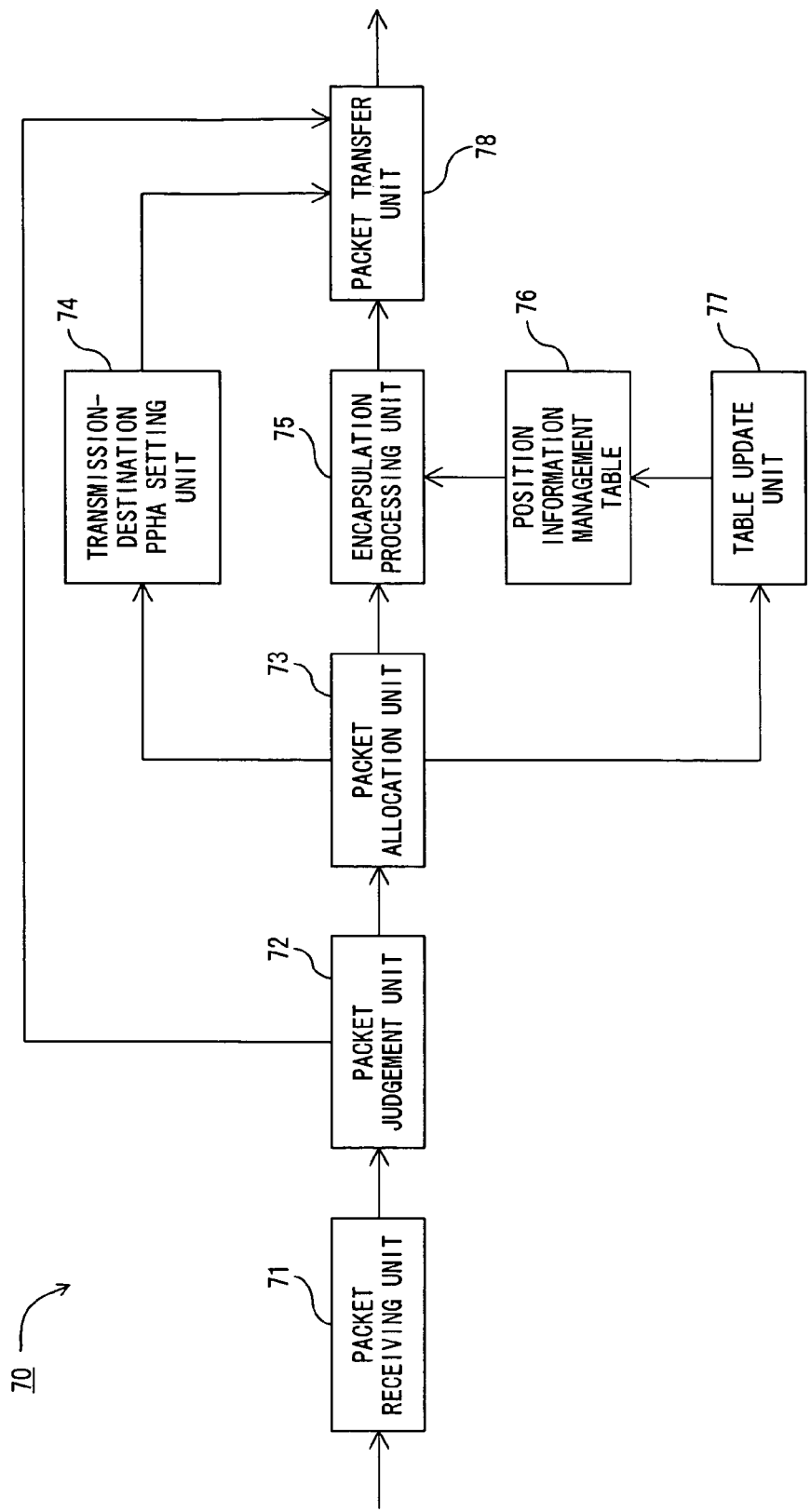
FIG. 12 is a block diagram showing the configuration of the transfer processing home agent (TPHA) in a second embodiment.

FIG. 12 is a block diagram showing the configuration of the transfer processing home agent (TPHA) in the second embodiment.

In FIG. 12, a TPHA 70 comprises a packet receiving unit 71 receiving a packet from outside, a packet judgement unit 72 judging whether the received packet should be processed by the TPHA 70, a packet allocation unit 43 allocating the packet which the packet judgement unit 72 judges should be processed by the TPHA 70 based on the kind of the packet, a transmission-destination PPHA setting unit 74 setting the PPHA of the transmission destination to a position information notification packet, an encapsulation processing unit 75 encapsulating an original packet by the packet which sets the care-of address corresponding to the home address as the transmission destination for the packet to the home address of the mobile node which is transmitted from the corresponding node (CN) with reference to the position information management table 76, a table update unit 77 updating the position information management table 76 by reflecting the contents included in the processing result packet of the position information from the PPHA, and a packet transmission unit 78 transmitting the packet to a set transmission destination.

In the second embodiment, the transfer order of the BU packet is set by designating a "next PPHA" in each PPHA. Position information processing for the BU packet is executed in any of the transmission destinations, and the processing result is returned to the TPHA as a processing result packet. Since the second embodiment does not have the PPHA—home address association table as does the first embodiment, the process of determining in which transmission destination the position information processing should be executed is needed. This determination processing is executed by each PPHA of the transmission destination. As the determination processing method, the following two methods are considered.

Figure 13:
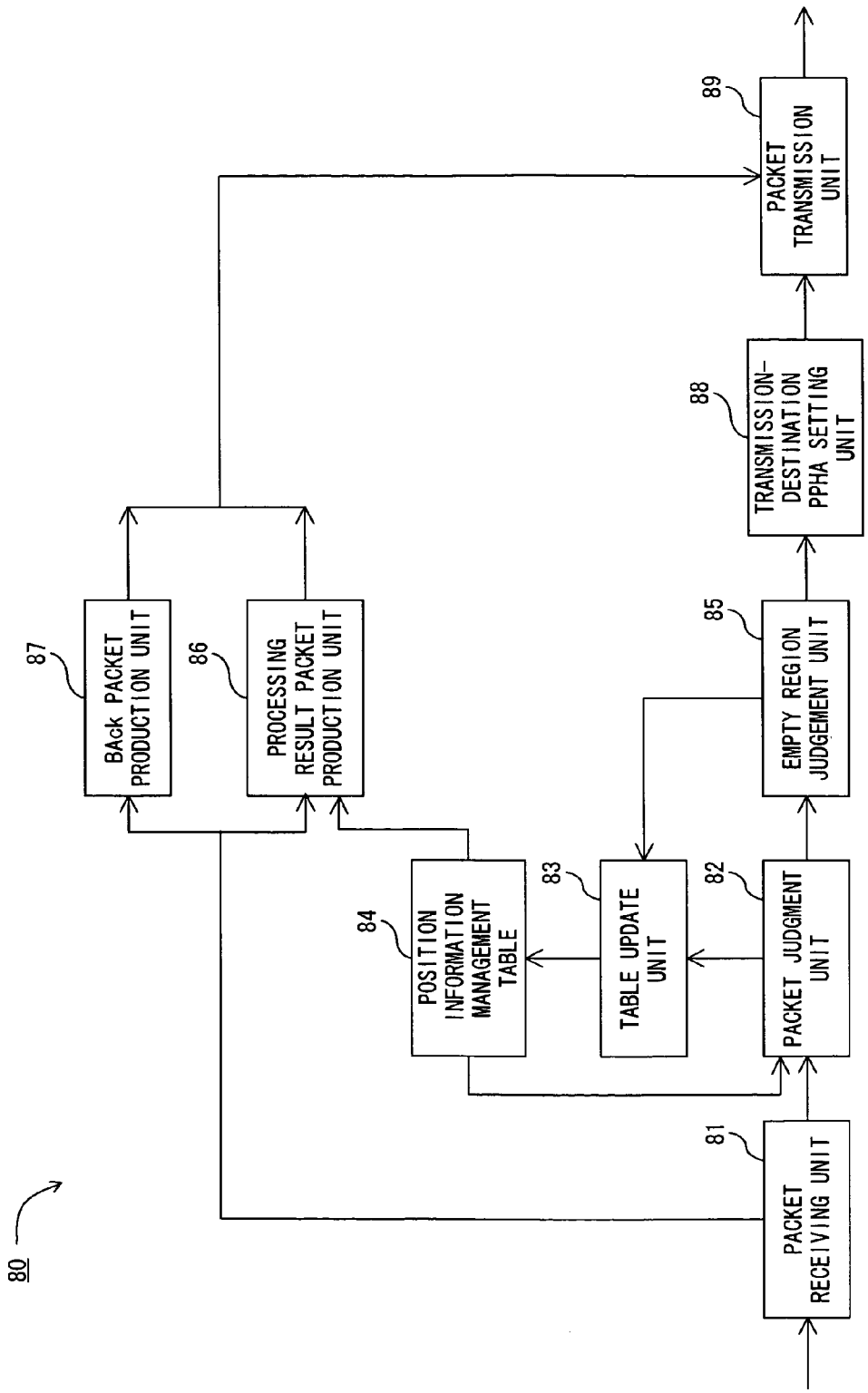
FIG. 13 is a block diagram showing the configuration of the position processing home agent (PPHA) in a second embodiment having the configuration for realizing a first determination method among the determination methods.

FIG. 13 is a block diagram showing the configuration of the position processing home agent (PPHA) in the second embodiment having the configuration for realizing the first determination method among the determination methods.

In FIG. 13, a PPHA 80 executes mainly the processing of the position information notification packet from a user, namely, binding update processing, on the platform of a server device, etc.

The PPHA 80 shown in FIG. 13 comprises a packet receiving unit 81 receiving a BU packet, a packet judgement unit 82 judging whether the received BU packet exists in a position information management table 84 and allocating the processing based on the judgement result, an empty region judgement unit 85 judging whether there is a region enough to execute the position information processing for the BU packet when the packet judgment unit 82 judges the BU packet received does not exist in the position information management table 84, a table update unit 83 updating the position information management table 84 based on the received BU packet when the received BU packet exists in the position information management table 84, or when the empty region judgement unit 85 judges that there is an enough empty region, a processing result packet production unit 86 producing a processing result notification packet for notifying the table contents as a result of update processing to the TPHA, a BAck packet production unit 87 producing a response packet (BAck packet) to a user (mobile node) in correspondence with the BU packet received, a transmission destination PPHA setting unit 88 setting the PPHA which the BU packet is next transmitted to when the empty region judgement unit 85 judges that there is not an enough empty region, and a packet transmission unit 89 transmitting the packet to a set transmission destination.

In this first method, since position information processing for the BU packet is processed in the PPHA in which an enough empty region exists without checking whether there is data corresponding to the BU packet up to the end of the link indicating the transfer order of each PPHA, the BU packet from the same mobile node sometimes exists in a plurality of PPHAs.

In such a case, when the attribute of the lifetime is retained in the position information management table on the side of the TPHA, the deletion packet of the data which is notified from the TPHA to the PPHA in accordance with the expiry of the lifetime is first received in the PPHA located on the upstream side (of the link) and the related item in the position information management table on the upstream PPHA is deleted. Consequently, in the PPHA located on the downstream side viewed from the TPHA, the data deleted in the upstream PPHA corresponds to the mobile node still remains even after the lifetime expires. In order to avoid the inconvenience that there is a possibility of wasting such memory resources, it is preferable to include the attribute of the lifetime in the position information management table on the side of the PPHA as one of its items.

Figure 14:
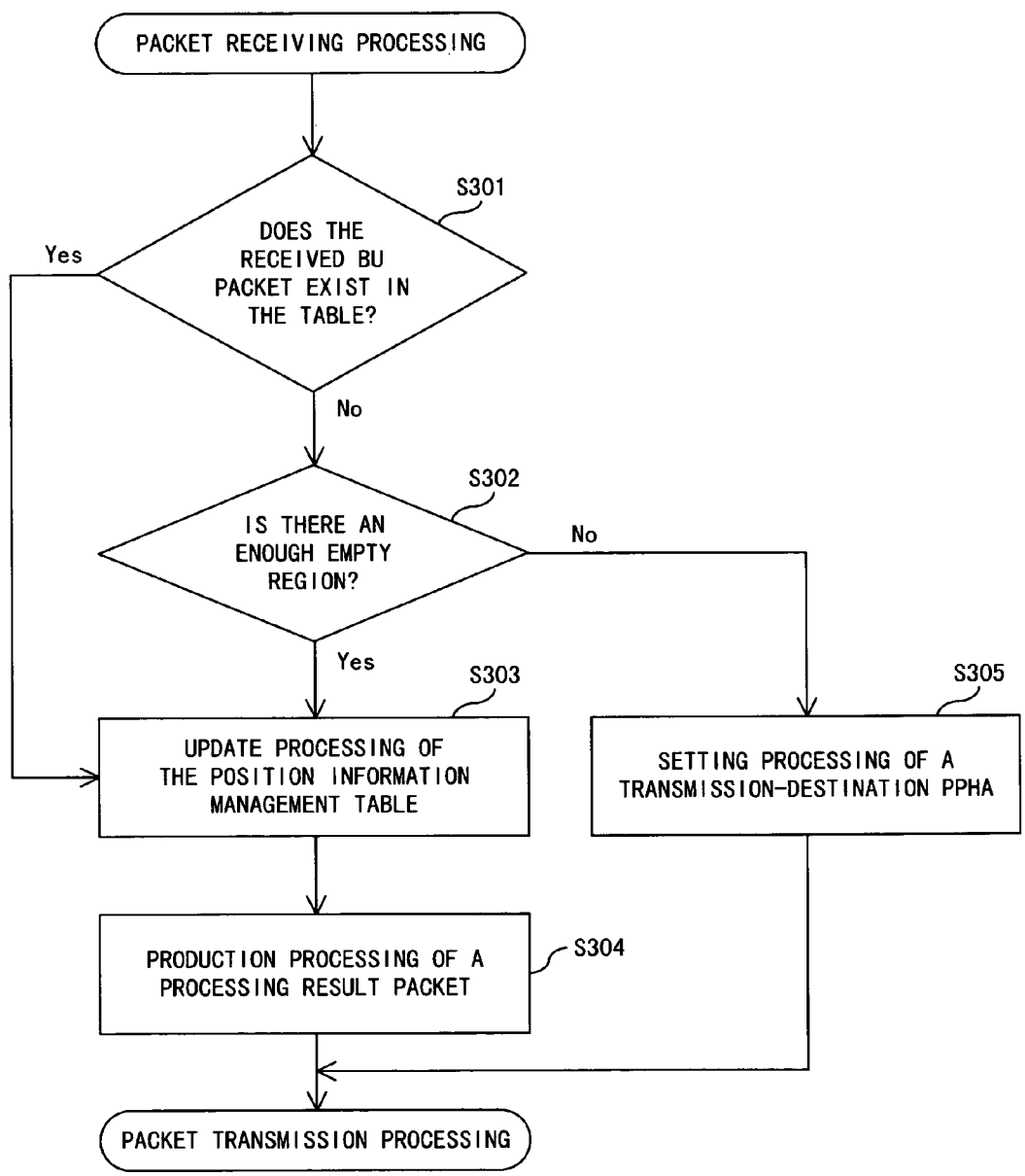
FIG. 14 is a flowchart showing the processing which is performed by the PPHA shown in FIG. 13.

FIG. 14 is a flowchart showing the processing which is performed by the PPHA shown in FIG. 13.

In FIG. 14, a series of processing is started when the BU packet is received by the packet receiving unit 81 of the PPHA.

First, in Step 301, the packet judgement unit 82 judges whether the received BU packet has already existed in the position information management table of the PPHA.

When the packet judgment unit 82 judges the data corresponding to the received BU packet does not to exist in the position information management table 84, then in Step S302, the empty region judgement unit 85 judges whether there is an empty region enough to perform the process of position information for the BU packet.

When the data corresponding to the received BU packet is judged to exist in the position information management table 84 in Step S301 or when an enough empty region is judged to exist in Step S302, then in Step S303, the table update unit 83 updates the position information management table 84 based on the received BU packet.

In Step S304, the processing result packet production unit 86 produces a processing result packet which notifies the table contents as a result of update processing (position information processing) to the TPHA. The destination of the produced processing result packet is set to the TPHA. In this case, the packet transmission unit 89 transmits the processing result packet to that transmission destination in Step S306.

When the empty region judgment unit 85 judges an enough empty region does not exist in Step S302, then in Step S305, the transmission-destination PPHA setting unit 88 sets the PPHA which the BU packet is next transmitted to. In this case, the packet transmission unit 89 transmits the BU packet to that transmission destination in Step S306.

Figure 15:
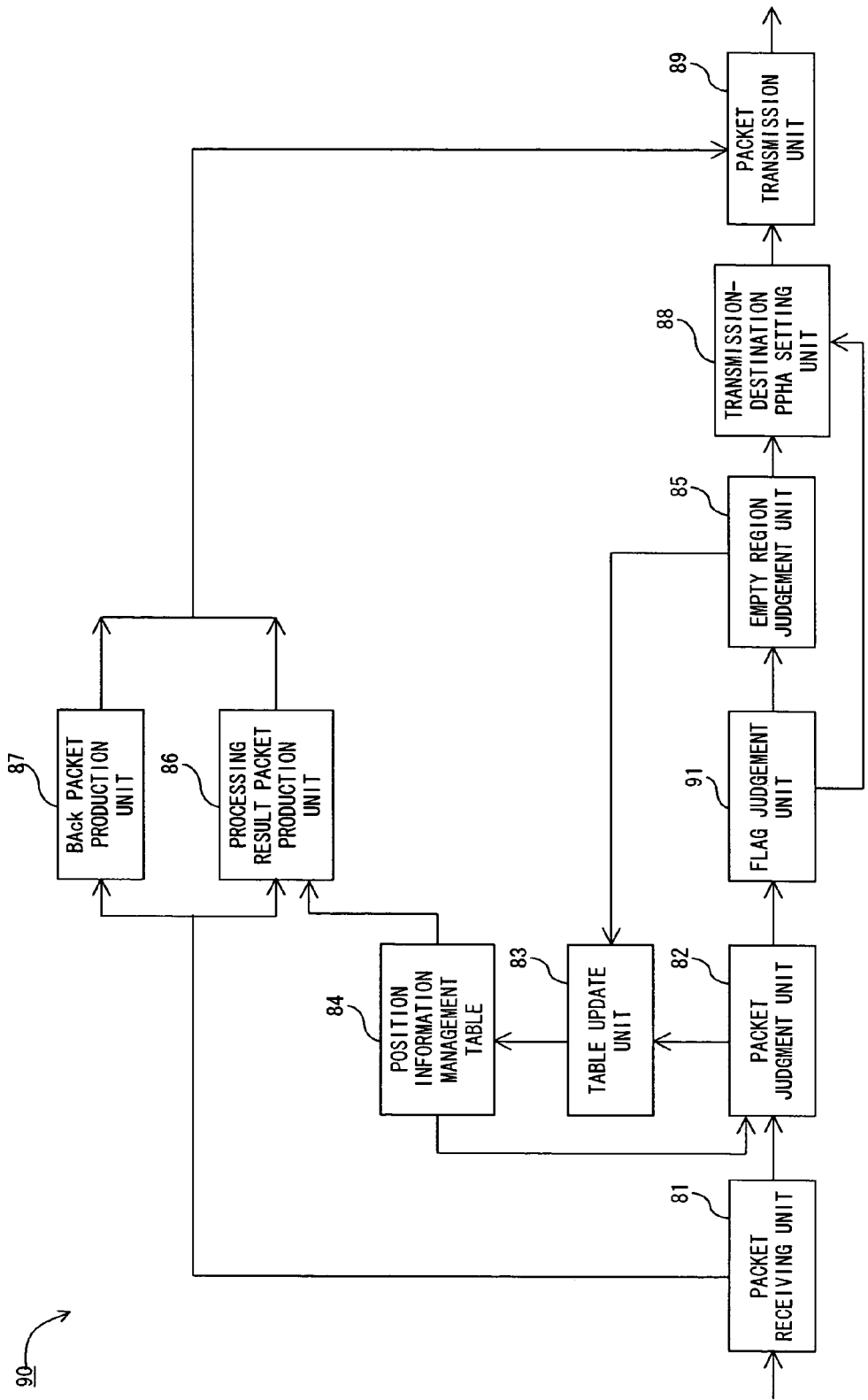
FIG. 15 is a block diagram showing the configuration of the position processing home agent (PPHA) in a second embodiment having the configuration for realizing a second determination method among the determination methods.

FIG. 15 is a block diagram showing the configuration of the position processing home agent (PPHA) in the second embodiment having the configuration for realizing the second determination method among the determination methods.

Mainly, some points which differ from FIG. 13 are described in FIG. 15. In the second determination method shown in FIG. 15, a flag judgement unit 91 is added compared with the first determination method shown in FIG. 13.

In this second method, the BU packet is transferred in the order of TPHA→PPHA$_1$→PPHA$_2$→ . . . PPHA$_n$, but when there is no data associated with the BU packet in the table of the PPHA, the BU packet is immediately transferred to the next PPHA. When there is no data associated with the BU packet in any PPHA from PPHA$_1$ to PPHA$_n$, the BU packet is transferred from PPHA$_n$ back to PPHA$_1$ to start second-cycle transfer processing. In this second-cycle processing, even when there is no data associated with the BU packet in the position information management table 84, if there is an enough empty region, the PPHA executes the position information processing for the BU packet as in the first method.

When the BU packet is received by the packet receiving unit 81 and the processing is started, the flag judgement unit 91 of the PPHA 90 shown in FIG. 15 judges whether the transfer of the BU packet is in the first-cycle or in the second-cycle, and branches the processing according to the judgement result. If it is in the first-cycle, the transmission destination PPHA setting unit 88 sets a transmission destination so as to transfer the BU packet to the next PPHA without checking the empty region. If it is in the second-cycle, the empty region judgement unit 85 judges whether there is an enough empty region, as in the first method, and if there is an enough empty region, the table update unit 83 performs the process of updating the table so as to execute position information processing for the BU packet.

In this second method, since it is checked whether there is the data associated with the BU packet up to the end of the link indicating the transfer order of each PPHA, there is no data associated with the BU packet which still remains after the lifetime expires depending on which position information management table of either TPHA or PPHA the lifetime is included in as in the first method.

Figure 16:
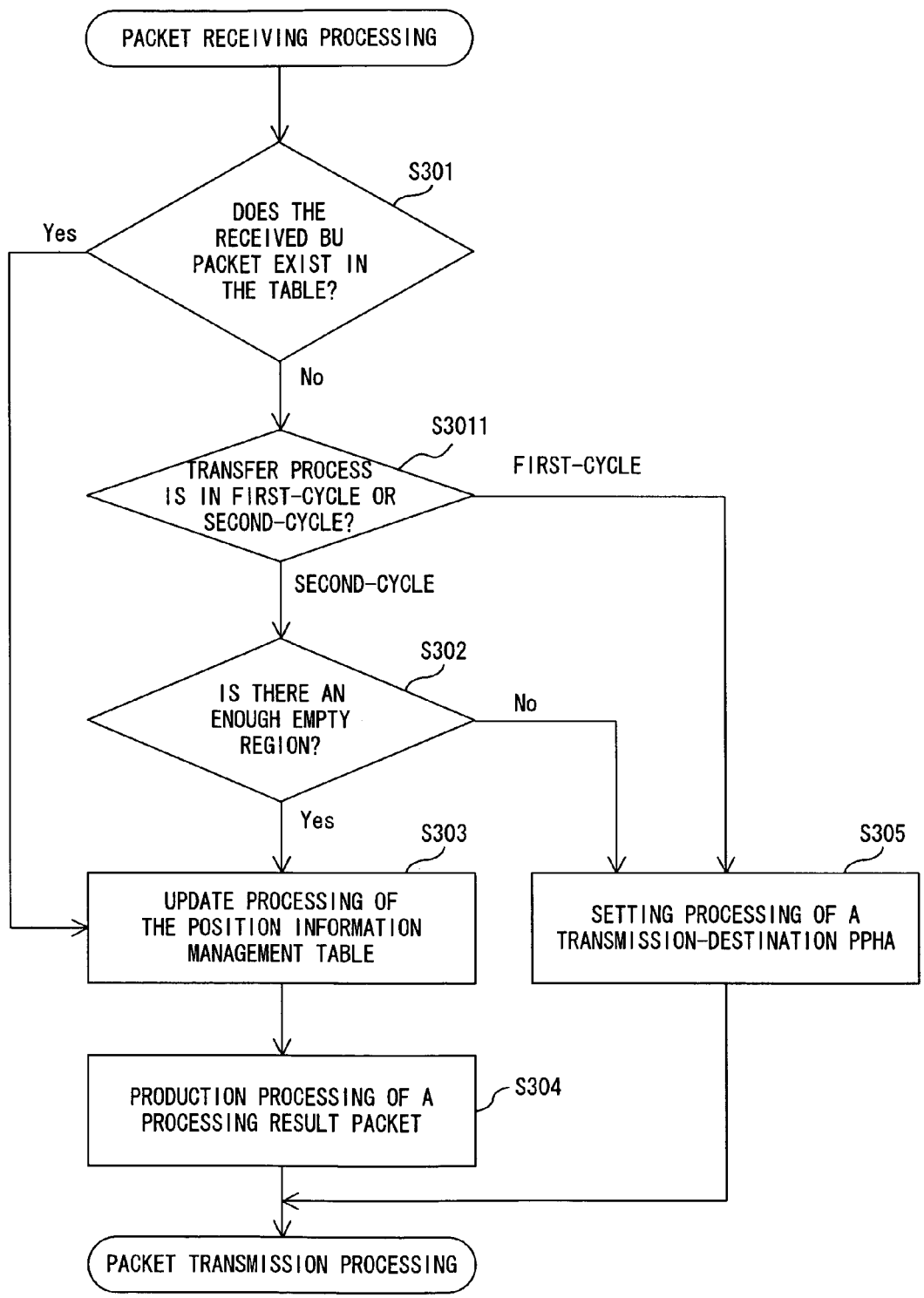
FIG. 16 is a flowchart showing the processing which is performed by the PPHA shown in FIG. 15.

FIG. 16 is a flowchart showing the processing which is performed by the PPHA shown in FIG. 15.

In FIG. 16, some points which differ from the flowchart shown in FIG. 14 are mainly described. In the second determination method shown in FIG. 16, compared with the flow of the determination method shown in FIG. 14, Step S3011 is added between Steps 301 and S302.

In Step S3011, the flag judgement unit 91 judges whether the transfer of the BU packet is in the first-cycle or in the second-cycle with reference to flag information. The flag information is retained in the BU packet, and for example, when the flag information is transmitted from the TPHA, said information is set to "1", and when the processing returns from PPHA$_n$ to PPHA$_1$, said information is changed from "1" to "2." When the transfer of the BU packet is judged to be in the first-cycle in Step S3011, the PPHA proceeds to the transmission-destination PPHA setting processing in Step S305. When the transfer of the BU packet is judged to be in the second-cycle in Step S3011, the PPHA proceeds to the empty region judgement processing in Step S302.

According to the second embodiment, since the system can be constructed by setting a "next PPHA" in each PPHA, PPHAs can be added easily.

FIG. 17 shows the transmission sequence of the binding update packet for binding update processing and the packet addressed to a user in the second embodiment.

In FIG. 17, mobile node MN #1 transmits a BU packet to the TPHA from a movement destination having care-of address CoA #1. Mobile node MN #2 transmits a BU packet to the TPHA from a movement destination having care-of address CoA #2.

In FIG. 17, the TPHA is the home agent which manages the home addresses of mobile nodes MN #1 and MN #2. Therefore, when the TPHA receives the BU packet from the mobile nodes MN #1 and MN #2, the received information is reflected to the position information management tables (binding cache tables) of the TPHA and each PPHA.

For example, in FIG. 17, the TPHA which receives the BU packet from mobile node MN #1 transmits the BU packet to PPHA #1 which is the next PPHA, and then the position information processing for the BU packet is executed in PPHA #1. That is to say, update processing is performed for the position information management table (binding cache table) of PPHA #1, and the packet obtained as a result of this processing is transmitted to the TPHA. The TPHA which receives the BU packet from mobile node MN #2 transmits the BU packet to the PPHA #1, but the PPHA #1 does not process the BU packet and transmits the BU packet to the PPHA #2 which is the next PPHA, and then the position information processing for the BU packet is executed in PPHA #2. That is to say, update processing is performed for the position information management table (binding cache table) of PPHA #2, and the packet obtained as a result of this processing is transmitted to the TPHA.

The TPHA develops its own position information management table based on the updated contents notified by PPHA #1 and PPHA #2.

In the sequence drawing shown in FIG. 17, after then, packets are transmitted from the corresponding node (CN) to mobile nodes MN #1 and MN #2. These packets are transmitted to the TPHA which manages the home addresses of mobile nodes MN #1 and MN #2, and the TPHA performs the process of encapsulating the CoA #1 and CoA #2 which are the present movement destination to the transmitted packet with reference to the position information management table and transmits the encapsulated packet to care-of addresses CoA #1 and CoA #2.

Figure 18:
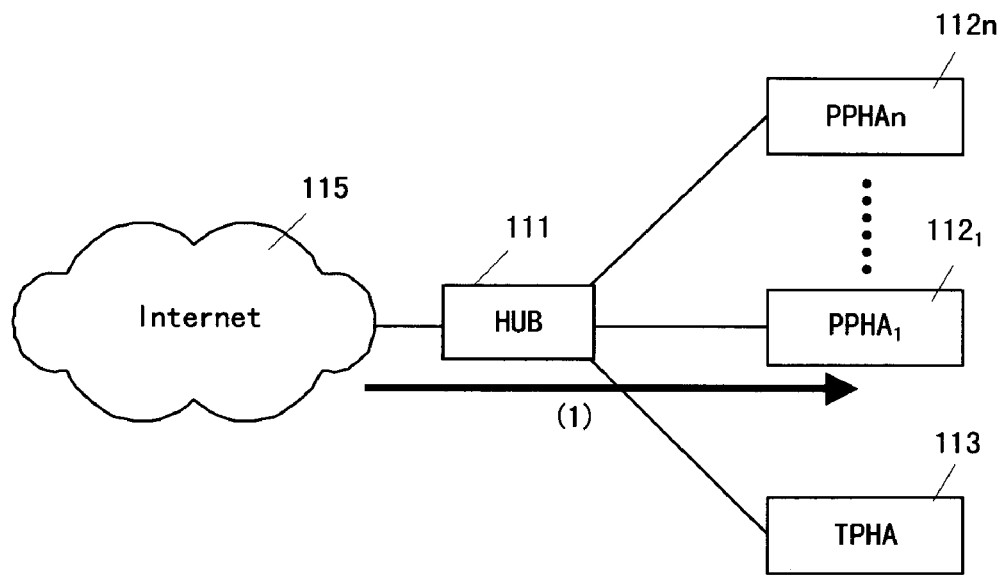
FIG. 18 is a schematic diagram of the home agent system in a third embodiment of the present invention.

FIG. 18 is a schematic diagram of the home agent system in the third embodiment of the present invention.

In FIG. 18, addresses which are accessible from outside are allocated not only to a TPHA 113, but also to all PPHAs from PPHA 112$_1$ to PPHA 112$_n$. This allocation of addresses makes it possible to directly access to outside from each PPHA. For example, in FIG. 18, the BU packet is directly transmitted from an external network 115 to PPHA 112$_1$, via a HUB 111.

In this case, an address of any of the PPHAs is registered as a transmission-destination address of the BU packet in each mobile node which is under management of the home agent system. Accordingly, a list of mobile nodes in charge of processing is retained by each PPHA from PPHA 112$_1$ to PPHA 112$_n$.

For example, when the BU packet is transmitted from the mobile node in which the address of PPHA #1 is registered as the notification-destination address of the BU packet, the BU packet directly reaches PPHA #1, and the PPHA #1 which receives the BU packet executes position information processing based on the information included in the BU packet. Then, the PPHA #1 notifies the result of this processing to the TPHA. The above described BAck packet is directly transmitted to outside (the mobile node) from the PPHA #1.

According to the third embodiment, since the BU packet directly reaches the PPHA in charge of processing, the number of packets flowing between the TPHA and the PPHA can be reduced.

Described below is the technology which can make the processing continue without interruption when a fault occurs to any of PPHAs.

Figure 19:
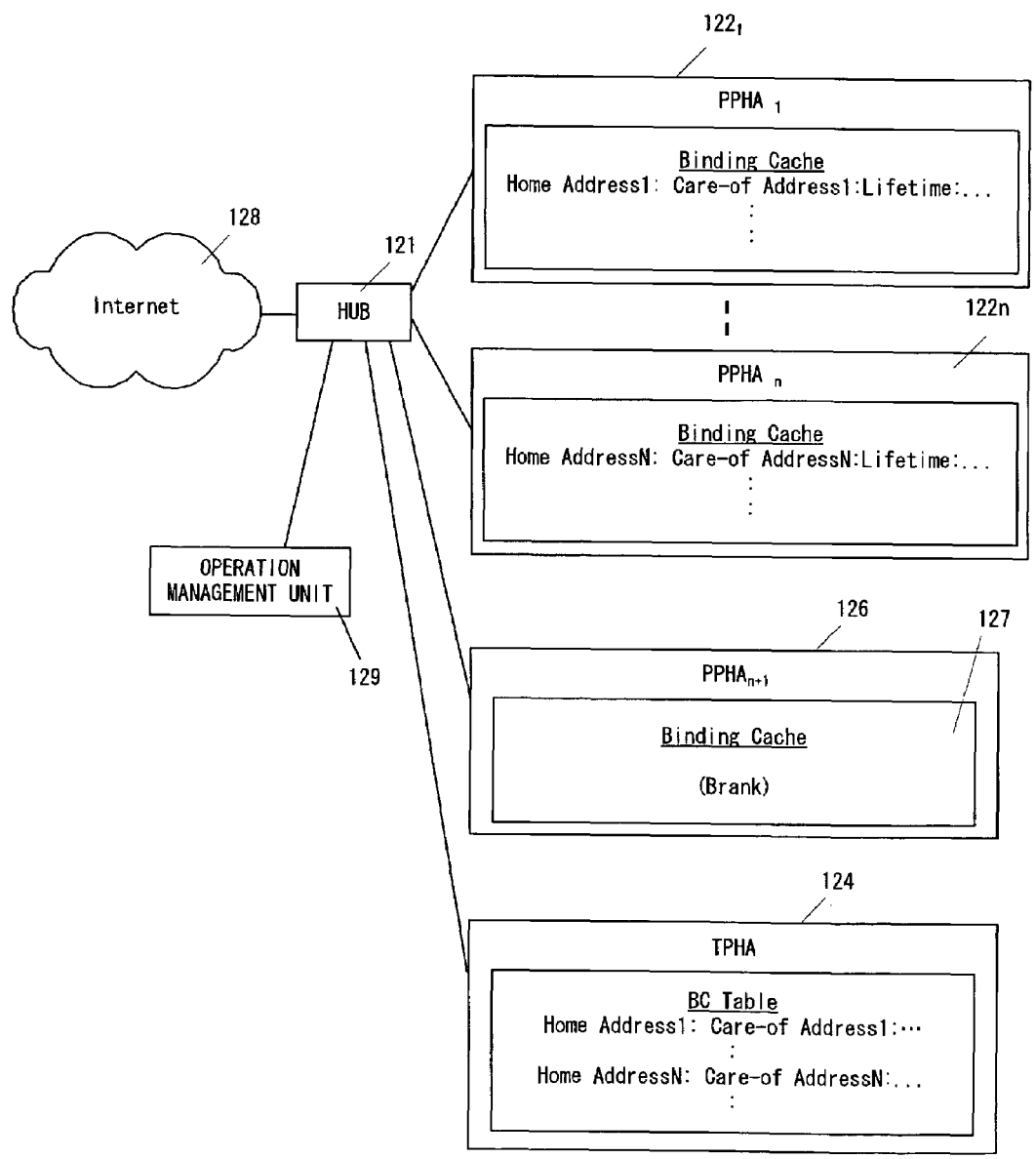
FIG. 19 is a schematic diagram of the home agent system which can continue processing without interruption even when a fault occurs to the home agent system.

FIG. 19 is a schematic diagram showing the configuration of the home agent system which can make the processing continue without interruption even when a fault occurs. This configuration can be applied, for example, as an additional configuration to the first and second embodiments.

In the home agent system shown in FIG. 19, the packet from the external network 128 is allocated to either the PHHA of PPHA $122_1$ ... PPHA $122_n$ or the TPHA 124 via the HUB 121.

In FIG. 19, a spare PPHA 126 and an operation management unit 129 are added to the configuration shown in the schematic diagram of the first embodiment (FIG. 5) or that of the second embodiment (FIG. 11). No information associated with any of the mobile nodes is set in the position information management table 127 of this spare PPHA 126. The operation management unit 129 can be realized as an independent device, or can be realized as a function in the TPHA or the HUB.

Described below is the operation of the home agent system when the operation management unit is added to the home agent system of the second embodiment.

As the processing method of the PPHA in the second embodiment, there are two methods, a first method and a second method. First, described below is the first method.

FIG. 20 shows the process of changing the transfer order between PPHAs in the first method of the second embodiment.

In FIG. 20, the transfer order before a fault occurs to the PPHA is set to TPHA→$PPHA_1$→$PPHA_2$→ ... $PPHA_{m-1}$. →$PPHA_{m+1}$→ ... →$PPHA_n$. In the home agent system having such a transfer order, when a fault has occurred to the $PPHA_m$ which is the PPHA in the transfer order of mth, the operation management unit detects the fault, and instructs the $PPHA_{m-1}$ which is the PPHA just prior to the one in which the fault has occurred to set the next PPHA so as to avoid the $PPHA_m$ in which the fault has occurred. For example, in FIG. 20, the $PPHA_{m-1}$ is instructed to appoint $PPHA_{m+1}$ as the next PPHA. Since the occurrence of a fault means that the work area for executing the position information processing for the BU packet decreases, a spare PPHA can be added to the end of the PPHA according to the occurrence of the fault. For example, in FIG. 20, the $PPHA_n$ which is the PPHA at the end of the transfer order is instructed to appoint a spare PHHA ($PPHA_{n+1}$) as the next PPHA.

Described below is how to cope with a fault in the second method of the second embodiment.

Figure 21:
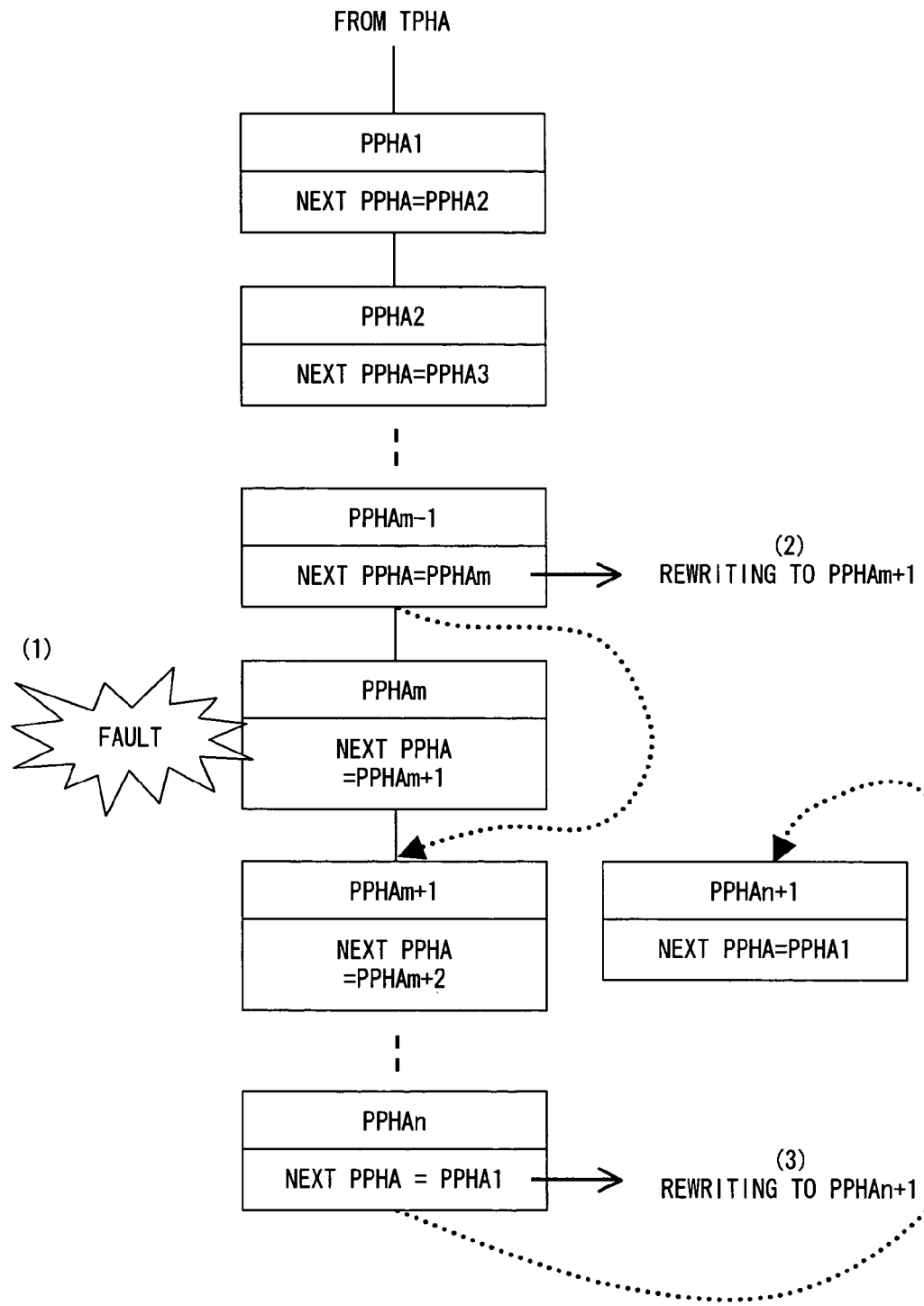
FIG. 21 shows the process of changing the transmission order between PPHAs in the second method of the second embodiment.

FIG. 21 shows the process of changing the transmission order between PPHAs in the second method of the second embodiment. In FIG. 21, explanations of the parts which overlap with the ones shown in FIG. 20 are omitted.

Unlike FIG. 20, in FIG. 21, $PPHA_1$ is set as the next PPHA even for the PPHAn which is the PPHA at the end of the transfer order.

As the processing when a fault occurs, for example, when a fault has occurred to the $PPHA_m$ which is the PPHA of mth in the transfer order, the operation management unit detects the fault and instructs the $PPHA_{m-1}$ which is the PPHA just prior to the one in which the fault has occurred to set the next PPHA so as to avoid the $PPHA_m$ in which the fault has occurred, as shown in FIG. 21. For example, in FIG. 21, the $PPHA_{m-1}$ is instructed to appoint $PPHA_{m+1}$ as the next PPHA. Since the occurrence of a fault means that the work area for executing the position information processing for the BU packet decreases, a spare PPHA can be added to the end of the PPHA according to the occurrence of the fault. For example, in FIG. 21, the $PPHA_n$ which is the PPHA at the end of the transfer order is instructed to appoint a spare PHHA ($PPHA_{n+1}$) as the next PPHA. Another characteristic of the second method is that the PPHA which is added as a spare PPHA is instructed to appoint the $PPHA_1$ which is the top PPHA in the transfer order as the next PPHA so that "the end PPHA appoints the top PPHA."

Described below is the operation of the home agent system when the operation management unit is added to the home agent system of the first embodiment.

In the first embodiment, some alteration is added to the PPHA—home address association table which determines the PPHA in charge of processing for each mobile node under management so that no BU packet is transmitted to the PPHA in which the fault has occurred. Such measures are taken for the home agent system when a fault occurs to it.

In the application of the home agent system to the first embodiment, the operation management unit and the spare PPHA are added, as shown in FIG. 19. Described below is the operation of the home agent system when a fault occurs to it.

When the operation management unit detects a fault which has occurred to a specific PPHA, the operation management unit instructs the TPHA to change the PPHA—home address association table so that the transfer of the BU packet is not made to the defective PPHA.

The home address (of the mobile node under management) corresponding to the defective PPHA is stored in this PPHA—home address association table in association with the spare PPHA based on this instruction.

In the application of the home agent system to the first embodiment, since the PPHA which performs the position processing of the BU packet is determined, the lifetime may be set to the position information management table of either the TPHA or the PPHA.

If the lifetime is not reflected at the time of the re-setting process of the above mentioned association in accompanying the occurrence of the fault, in the spare PPHA, the lifetime can be counted from, for example, the initial value.

Thus, for the occurrence of a fault, the link order of the position processing home agent (PPHA) is changed, or some alteration is added to the table which determines the PPHA in charge of processing, so processing can be continued without interruption even when a fault occurs.

Figure 22:
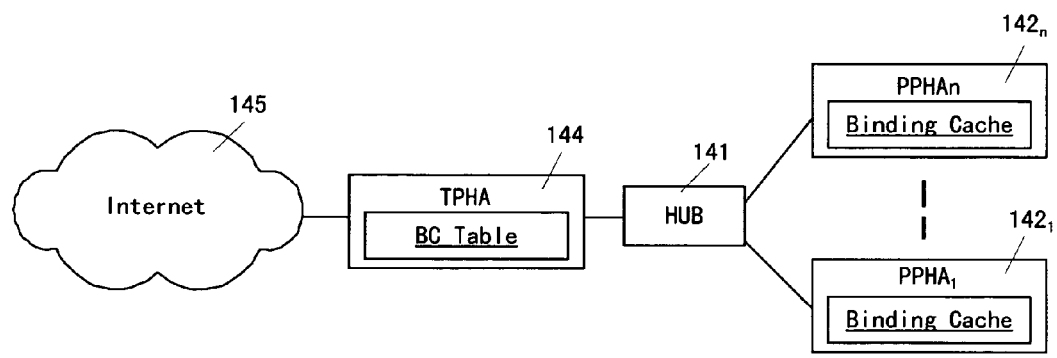
FIG. 22 is a schematic diagram of the home agent system in a fourth embodiment of the present invention.

FIG. 22 is a schematic diagram of the home agent system in the fourth embodiment of the present invention. In the fourth embodiment shown in FIG. 22, for example, compared with the first and second embodiments, the arrangement of the HUB 141, the TPHA 144, each PPHA $142_1$ ... $142_n$ differs. The fourth embodiment is configured in such a way that one end of the TPHA 144 is connected to the external network 145. In this configuration, the home agent system of the first embodiment or the second embodiment can be applied when the BU packet from the mobile node which is transmitted to the TPHA 144 is allocated to each PPHA $142_1$ ... $142_n$.

When the system configuration of the fourth embodiment is adopted, a port for external access and a port for internal access are required on the side of the TPHA, but since each PPHA is physically separated from the external network, the security of the home agent system can be easily improved. Moreover, the band width can be expanded, and the processing ability can be improved by providing a dedicated port for transmission to and receiving from outside and for internal access in the TPHA 144.

FIG. 23 is a block diagram showing a variation of each embodiment. In this variation, a TPPHA (transfer and position processing home agent) 154 which serves as both TPHA and PPHA is used in place of the TPHA. For this transformed configuration example, too, the HUB 151, the TPPHA 154 and each PPHA $152_1 \ldots 152_n$ can be arranged as shown in FIG. 24 so that one end of the TPPHA 154 is connected to the external network 155.

The functions which the TPHA or the PPHA has can be realized as a tight-coupling type system in which the functions are developed as one blade in a blade server device and the blade is included in one set of blade server system, or can be realized as a rough-coupling type system which makes the TPHA have the role of a router and makes the PPHA have the role of a server device.

Figure 25:
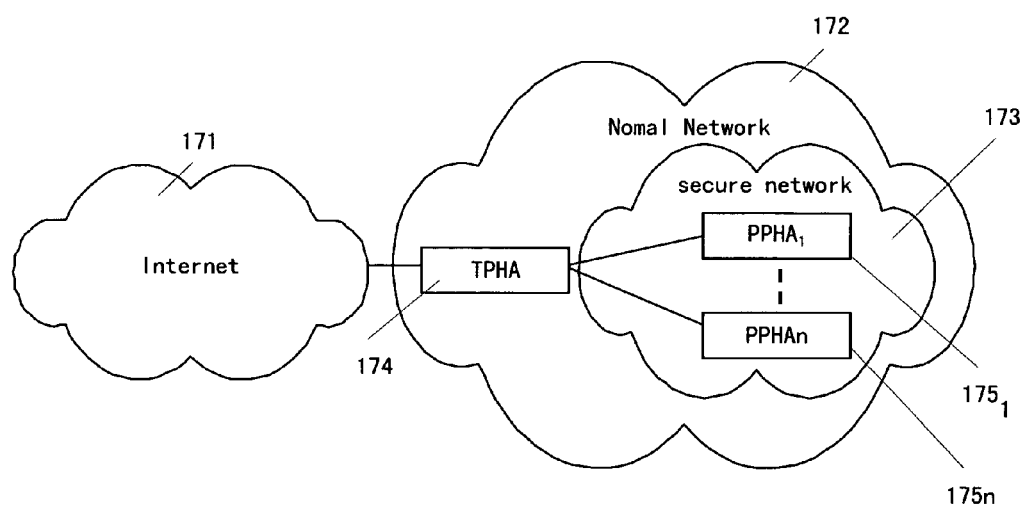
FIG. 25 shows an example of the configuration for which security is considered when the home agent system is constituted by a rough coupling type.

FIG. 25 shows an example of the configuration for which security is considered when the home agent system is constituted by a rough-coupling type system.

In FIG. 25, a local area network (LAN) 172 which is provided in an enterprise, etc. is connected to an external network 171. Only such a level of security that someone can freely access from an external network 171 is provided in this LAN 172. In FIG. 25, a secure network 173 in which an access limit is provided so that access only from a specific apparatus or a specific packet can be made exists in this LAN 172.

The TPHA 174 has the function for intercepting the packet to which an unspecific apparatus accesses a mobile node and transferring the packet to the care-of address of the mobile node. Therefore, it is preferable to mount the TPHA 174 on the network 172 which is freely accessible from the external network 171, as shown in FIG. 25. On the other hand, since each PPHA $175_1 \ldots 175_n$ has the function for managing the care-of address indicating the transfer destination of the packet (position information processing function), security must be intensified so that a spiteful user does not operate the care-of address and he does not capture the packet. Therefore, it is preferable to install each PPHA in the secure network 173, as shown in FIG. 25.

Thus, in the present invention, the configuration is such that the TPHA 174 and each $175_1 \ldots 175_n$ are dispersed, so it is possible to set a security level according to the processing contents of each home agent.

FIG. 26 shows an example of the configuration which makes the reduction of a processing load possible when the home agent system is constituted by a rough coupling system.

In FIG. 26, a network 182 to which an operator of a home agent system belongs is connected to an external network 181. PPHA $184_1$, to PPHA $184_n$, which are in charge of position information processing are installed in the network 182 to which the operator belongs. The network 183 in which TPHA 186 corresponding to the PPHAs is installed is connected to the external network 181.

Usually, when a certain apparatus transmits and receives a packet to and from a mobile node, the packet reaches the mobile node via a home agent. However, the farther the present position is from the home address of the mobile node, the more paths the packet passes through and is transferred, thus causing a lot of transfer time to be spent. When the mobile node exists in the same network as the TPHA 186 is installed, the TPHA 186 stops intercepting the packet to the mobile node, and the mobile node transmits and receives the packet to and from any other apparatus on the network in the same way as a general terminal. In short, it is preferable that the mobile nodes which the TPHA 186 manages should be the ones in which the possibility that the mobile nodes are under the TPHA 186 is the highest.

It is preferable to install the PPHA $184_1$, to PPHA $184_n$, having the function for managing a care-of address, for example, in the operator's network in which the security level is set to a higher level.

Thus, it is possible to reduce a processing load in the corresponding home agent system by selecting the mobile node having a high possibility that it is under the TPHA 186 as a mobile node to be registered in the TPHA 186, for example, from the aspect of a user's average action range.

FIG. 27 shows the loading of programs.

Naturally, the process of determining the transmission destination PPHA, determining whether position information processing to be executed, etc., of the present invention can be realized by a general computer system. Such a computer 195 basically comprises a body 196 and a memory 197. The program of the present invention can be loaded to the memory 197 from a portable storage medium 199, and the program of the present invention can be loaded to the memory 197 from a providers of the program via a network 198.

What is claimed is:

1. A home agent system which manages position information of a mobile node and transfers a packet to the mobile node using the position information, and which comprises:
   one or more position processing devices processing a position information notification packet transmitted from the mobile node and acquiring the position information of the mobile node; and
   a transfer processing device transferring the packet addressed to the mobile node, which is connected to one or more position processing devices,
   wherein the transfer processing device transfers the position information notification packet to the position processing device, and
   the transfer processing device has a position information management table which stores the position information acquired by the position processing device in association with the home address of the mobile node and a transfer unit transferring the packet addressed to the mobile node using the stored position information.

2. A home agent system which manages position information of a mobile node and transfers a packet to the mobile node using the position information, and which comprises:
   one or more position processing devices processing a position information notification packet transmitted from the mobile node and acquiring the position information of the mobile node; and
   a transfer processing device transferring the packet addressed to the mobile node, which is connected to one or more position processing devices, wherein
   the transfer processing device has a position information management table which stores the position information acquired by the position processing device in association with the home address of the mobile node and a transfer unit transferring the packet addressed to the mobile node using the stored position information,
   the transfer processing device is installed in a network having a first security level, and
   one or more position processing devices are installed in a network having a higher security level than the first security level.

3. The home agent system according to claim 1, wherein
   the transfer unit intercepts the position information notification packet and transfers it to one of the position processing devices; and
   the position information management table stores the position information acquired by the position processing device to which the position information notification packet is transferred.

4. The home agent system according to claim 3, wherein
   the transfer processing device comprises a position processing device—home address association table which stores the position processing device in charge of processing in association with the managed home address of each mobile node and a transmission-destination device determination unit determining the position processing device of a transmission destination of a position information notification packet based on the position processing device—home address association table; and the transfer unit transmits the position information notification packet to a determined transmission destination.

5. The home agent system according to claim 4, wherein the transmission-destination device determination unit retrieves the home address included in the received position information notification packet of the mobile node from the position processing device—home address association table and determines the position processing device in charge of processing which corresponds to the home address which conforms to the home address included in the packet as a transmission destination.

6. The home agent system according to claim 3, wherein the position processing device comprises:
  a receiving unit receiving the position information notification packet of the mobile node;
  a position processing execution possibility determination unit determining whether the received position information notification packet should be processed by the position processing device;
  a position information management table which stores the position information obtained by processing the position information notification packet when the position information notification packet is determined to be processed by the position processing device;
  a transfer-destination setting unit setting the position processing device to which the position information notification packet is transferred next as a transfer destination for the position information notification packet when the position information notification packet is determined not to be processed by the position processing device; and
  a transmission unit transmitting the position information notification packet in which the transfer destination is set.

7. The home agent system according to claim 6, wherein the position processing execution possibility determination unit retrieves the home address included in the received position information notification packet of the mobile node from the ones in the position information management table;
  determines that the position processing should be executed by the position processing device when the home address which conforms to the home address of the position information notification packet exists in said table; and
  determines that the position processing should not be executed by the position processing device when the home address which conforms to the home address of the position information notification packet does not exist in said table.

8. The home agent system according to claim 4, which further comprises an operation management unit which instructs the transfer processing device to separate the part in which a fault has occurred when a fault occurred to any of the position processing devices and a spare position processing device to be used when a fault occurs, wherein
  the operation management unit re-sets the home address of each mobile node associated with the position processing device in which the fault has occurred so that said home address is associated with the spare position processing device.

9. The home agent system according to claim 6, which further comprises an operation management unit which instructs, when a fault has occurred to any of the position processing devices, the position processing device related to the position processing device in which the fault has occurred to separate the part in which the fault has occurred, wherein
  the operation management unit instructs, when the fault has occurred, the related position processing device to set the position processing device of the transmission destination so as to avoid the part in which the fault has occurred.

10. The home agent system according to claim 1, wherein a mobile node which the transfer processing device manages is selected from among the mobile nodes having a high possibility that they are under the transfer processing device.

11. The home agent system according to claim 1, wherein a transfer and position processing home agent which serves as both the transfer processing home agent and the position processing home agent is used in place of the transfer processing home agent.

12. A transfer processing device, comprising:
  a receiving unit receiving the position information notification packet which a mobile node transmits;
  a judgement unit judging whether the received position information notification packet should be processed by the transfer processing device;
  a transmission destination determination unit determining the position processing device to which a position information update processing is executed as a transmission destination based on the home address of the mobile node associated with the position information notification packet when the position information notification packet is determined to be processed by the transfer device; and
  a transfer unit transferring the position information notification packet to the determined position processing device of the transmission destination.

* * * * *